United States Patent
Ahn

(10) Patent No.: US 11,356,687 B2
(45) Date of Patent: Jun. 7, 2022

(54) IMAGE ENCODING/DECODING METHOD AND DEVICE

(71) Applicant: DIGITALINSIGHTS INC., Seoul (KR)

(72) Inventor: Yong Jo Ahn, Seoul (KR)

(73) Assignee: DIGITALINSIGHTS INC., Seoul (KR)

( * ) Notice: Subject to any disclaimer, the term of this patent is extended or adjusted under 35 U.S.C. 154(b) by 0 days.

(21) Appl. No.: 17/355,021

(22) Filed: Jun. 22, 2021

(65) Prior Publication Data

US 2021/0321126 A1 Oct. 14, 2021

Related U.S. Application Data

(63) Continuation of application No. 17/054,737, filed as application No. PCT/KR2019/006373 on May 28, 2019.

(30) Foreign Application Priority Data

| | | |
|---|---|---|
| May 30, 2018 | (KR) | 10-2018-0061881 |
| Jun. 28, 2018 | (KR) | 10-2018-0074800 |
| Jul. 4, 2018 | (KR) | 10-2018-0077878 |

(51) Int. Cl.
*H04N 19/61* (2014.01)
*H04N 19/62* (2014.01)
(Continued)

(52) U.S. Cl.
CPC ........... *H04N 19/44* (2014.11); *H04N 19/105* (2014.11); *H04N 19/119* (2014.11);
(Continued)

(58) Field of Classification Search
CPC .... H04N 19/64; H04N 19/129; H04N 19/176; H04N 19/12; H04N 19/44; H04N 19/62; H04N 19/63
See application file for complete search history.

(56) References Cited

U.S. PATENT DOCUMENTS 8,532,176 B2 * 9/2013 Segall .................... H04N 19/40
375/240.11
9,154,790 B2 10/2015 Yie et al.
(Continued)

FOREIGN PATENT DOCUMENTS

| JP | 2015088805 A | 5/2015 |
|---|---|---|
| KR | 101197176 B1 | 11/2012 |

(Continued)

OTHER PUBLICATIONS

A Two-stage Algorithm for the Early Detection of Zero-quantized DCT coefficients in HEVC; 2017. (Year: 2017).*
(Continued)

*Primary Examiner* — Luis Perez-Fuentes
(74) *Attorney, Agent, or Firm* — Morgan, Lewis & Bockius LLP

(57) ABSTRACT

An image encoding/decoding method of the present invention constructs a merge candidate list of a current block, derives motion information of the current block on the basis of the merge candidate list and a merge candidate index, and performs inter prediction on the current block on the basis of the derived motion information, wherein the merge candidate list can improve encoding/decoding efficiency by adaptively determining a plurality of merge candidates on the basis of the position or size of a merge estimation region (MER) to which the current block belongs.

6 Claims, 13 Drawing Sheets

(51) Int. Cl.
   *H04N 19/44*    (2014.01)
   *H04N 19/105*   (2014.01)
   *H04N 19/119*   (2014.01)
   *H04N 19/132*   (2014.01)
   *H04N 19/137*   (2014.01)
   *H04N 19/159*   (2014.01)
   *H04N 19/176*   (2014.01)
   *H04N 19/96*    (2014.01)

(52) U.S. Cl.
   CPC ......... *H04N 19/132* (2014.11); *H04N 19/137* (2014.11); *H04N 19/159* (2014.11); *H04N 19/176* (2014.11); *H04N 19/62* (2014.11); *H04N 19/96* (2014.11)

(56) References Cited

U.S. PATENT DOCUMENTS

| | | | | |
|---|---|---|---|---|
| 10,499,061 | B2* | 12/2019 | Koo | H04N 19/46 |
| 10,812,829 | B2* | 10/2020 | MacInnis | H04N 19/61 |
| 11,044,471 | B2* | 6/2021 | Lee | H04N 19/14 |
| 11,128,887 | B2 | 9/2021 | Lee et al. | |
| 11,176,711 | B2* | 11/2021 | Lim | G06T 9/007 |
| 2007/0058720 | A1* | 3/2007 | Park | H04N 19/40 |
| | | | | 375/240.12 |
| 2011/0249755 | A1* | 10/2011 | Shibahara | H04N 19/129 |
| | | | | 375/240.18 |
| 2011/0310973 | A1* | 12/2011 | Cheon | H04N 19/176 |
| | | | | 375/240.18 |
| 2012/0207398 | A1* | 8/2012 | Shimauchi | G06T 9/007 |
| | | | | 382/233 |
| 2013/0279595 | A1 | 10/2013 | Lee et al. | |
| 2015/0023426 | A1 | 1/2015 | Yie et al. | |
| 2015/0117540 | A1 | 4/2015 | Morimoto | |
| 2017/0094309 | A1 | 3/2017 | Lee et al. | |
| 2017/0324643 | A1* | 11/2017 | Seregin | H04N 19/60 |
| 2020/0288134 | A1* | 9/2020 | Lim | H04N 19/167 |
| 2021/0321117 | A1* | 10/2021 | Ohkawa | H04N 19/159 |
| 2021/0321126 | A1* | 10/2021 | Ahn | H04N 19/463 |
| 2021/0337197 | A1* | 10/2021 | Lee | H04N 19/132 |

FOREIGN PATENT DOCUMENTS

| | | |
|---|---|---|
| KR | 101205017 B1 | 11/2012 |
| KR | 101354086 B1 | 1/2014 |
| KR | 20140077824 A | 6/2014 |
| WO | WO 2019/231206 A1 | 12/2019 |

OTHER PUBLICATIONS

Transform Coefficient Coding in HEVC; Sole; Dec. 2012. (Year: 2012).*

A Two-stage Algorithm for the Early Detection of Zero-quantized DCT coefficients; 2017. (Year: 2017).*

DigitalInsights, Inc., International Search Report, PCT/KR2019/006373, dated Sep. 3, 2019, 10 pgs.

Ahn, Non-Final Office Action, U.S. Appl. No. 17/054,737, dated Sep. 29, 2021, 6 pgs.

* cited by examiner

IMAGE ENCODING/DECODING METHOD AND DEVICE

CROSS REFERENCE TO RELATED APPLICATIONS

This application is a continuation application of U.S. patent application Ser. No. 17/054,737, filed Nov. 11, 2020, which is a United States National Stage Application filed under 35 U.S.C. § 371 of PCT Patent Application Serial No. PCT/KR2019/006373 filed on May 28, 2019, which claims the benefit of and priority to Korean Patent Application Nos. 10-2018-0077878, filed on Jul. 4, 2018, 10-2018-0074800, filed Jun. 28, 2018, and 10-2018-0061881, filed May 30, 2018. U.S. patent application Ser. No. 17/054,737, filed Nov. 11, 2020, is incorporated by reference in its entirety.

TECHNICAL FIELD

The present disclosure relates to an image encoding/decoding method and device.

BACKGROUND ART

As a market demand for a high resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding and in-loop filter. On the other hand, as a demand for a high resolution image has increased, a demand for stereoscopic image contents has increased as a new image service. A video compression technology for effectively providing high resolution and ultra high resolution stereo-scopic image contents has been discussed.

DISCLOSURE

Technical Problem

A purpose of the present disclosure is to provide an image encoding/decoding method and device that efficiency is improved.

In addition, a purpose of the present disclosure is to provide a method and a device for adaptively configuring a merge candidate list of a current block according to a merge estimation region (MER) in a block merge technology.

In addition, a purpose of the present disclosure is to provide a method and a device in which an additional merge candidate utilizes motion information of a block spatially separated from a current block by a distance of a plurality of pixels in configuring the merge candidate list of a current block according to a merge estimation region in the block merge technology of the present disclosure.

In addition, in an image encoding/decoding method and device, a purpose of the present disclosure is to provide a method and a device for effective residual signal transform and inverse transform.

In addition, in an image encoding/decoding method and device, a purpose of the present disclosure is to provide a video coding method and device performing effective motion vector coding.

In addition, a purpose of the present disclosure is to provide a computer readable recording medium which stores a bitstream generated by the image encoding method/device.

Technical Solution

An image decoding method and device according to the present disclosure provides a method and a device for adaptively configuring a merge candidate list of a current block according to a merge estimation region (MER) in a block merge technology.

A video coding method using a merge estimation region of the present disclosure is about a method of adaptively configuring the merge candidate list of a current block according to a merge estimation region (MER), the merge candidate list of a current block may be adaptively configured according to a merge estimation region (MER). In this case, adaptively configuring the merge candidate list includes sharing one merge candidate list, removing an existing merge candidate from a list or adding an additional merge candidate to a list, according to whether to belong to the same merge estimation region as a block which is spatially or temporally adjacent to a current block.

A video coding device using a merge estimation region of the present disclosure is about an encoder or a decoder which adaptively configures the merge candidate list of a current block according to a merge estimation region (MER), the merge candidate list of a current block may be adaptively configured according to a merge estimation region (MER). In this case, adaptively configuring the merge candidate list includes removing an existing merge candidate from a list or adding an additional merge candidate to a list according to whether to belong to the same merge estimation region as a block which is spatially or temporally adjacent to a current block.

In addition, in configuring the merge candidate list of a current block according to a merge estimation region (MER), the additional merge candidate may utilize motion information of a block spatially separated from a current block by a distance of a plurality of pixels.

A video coding method and device according to the present disclosure is about transform encoding and decoding among video coding technologies, a method and a device transforming and/or inversely transforming only some residual signals of one square or non-square block are included.

A video coding method and device according to the present disclosure is about a method and a device which store a motion vector and a reference image index in video encoding and decoding and use a motion vector and a reference image used around a block and in a previous image in decoding and encoding afterwards, among video coding technologies.

Advantageous Effects

According to the present disclosure, an effective image encoding/decoding method and device may be provided by using a block merge technology.

In addition, as the merge candidate list of a current block is adaptively configured according to a merge estimation region (MER), an image encoding/decoding method and device improving encoding/decoding efficiency may be provided.

According to the present disclosure, an image encoding/decoding method and device that allow effective residual signal transform and/or inverse transform may be provided.

According to the present disclosure, an image encoding/decoding method and device that enable effective motion vector coding may be provided.

In addition, according to the present disclosure, a computer readable recoding medium storing a bitstream generated by an image encoding method/device according to the present disclosure may be provided.

BEST MODE

Figure 1:
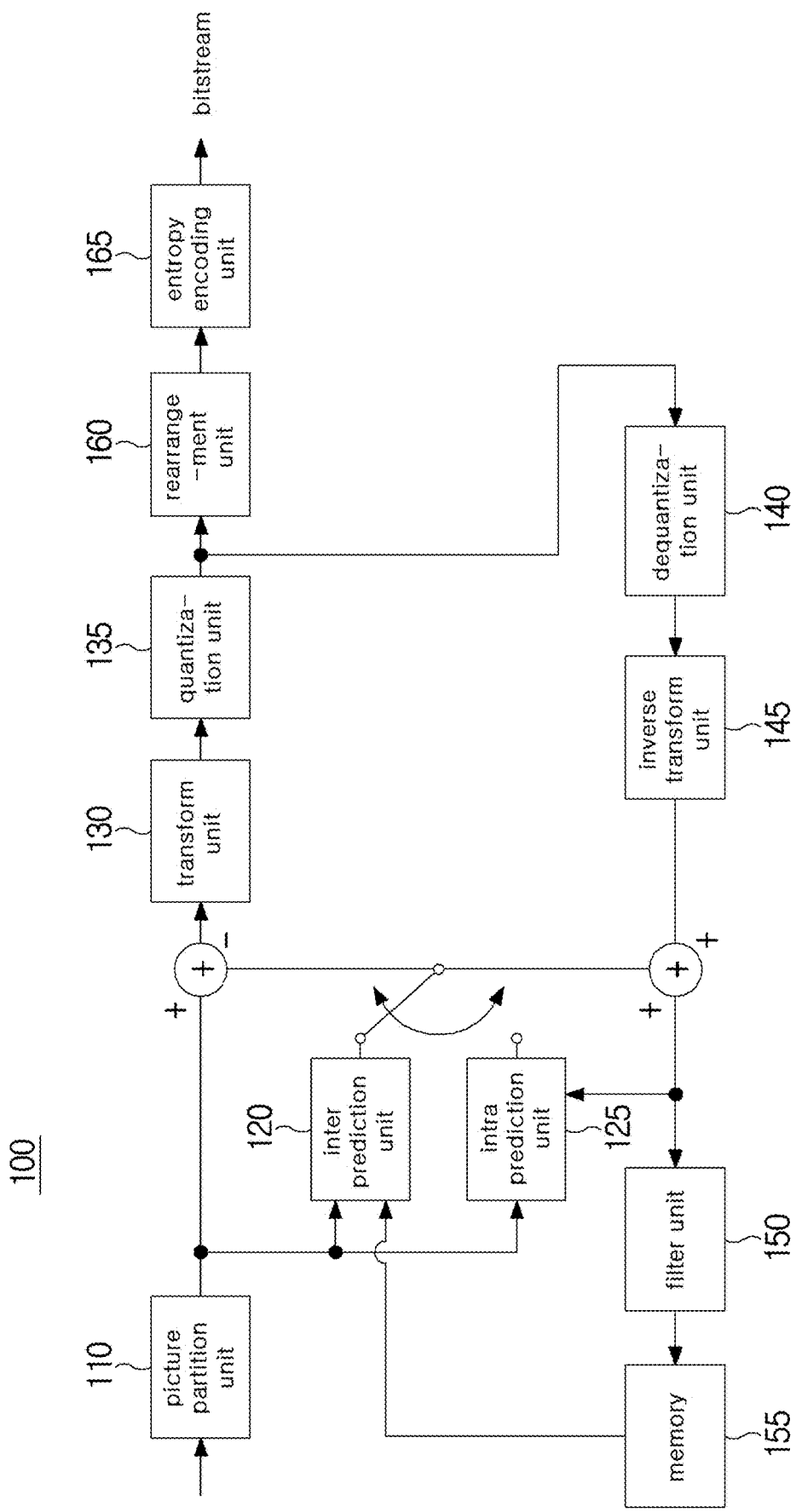
FIG. 1 is a block diagram showing an image encoding device according to the present disclosure.

An image decoding method and device according to the present disclosure provides a method and a device for adaptively configuring a merge candidate list of a current block according to a merge estimation region (MER) in a block merge technology.

A video coding method using a merge estimation region of the present disclosure is about a method of adaptively configuring the merge candidate list of a current block according to a merge estimation region (MER), the merge candidate list of a current block may be adaptively configured according to a merge estimation region (MER). In this case, adaptively configuring the merge candidate list includes sharing one merge candidate list, removing an existing merge candidate from a list or adding an additional merge candidate to a list, according to whether to belong to the same merge estimation region as a block which is spatially or temporally adjacent to a current block.

A video coding device using a merge estimation region of the present disclosure is about an encoder or a decoder which adaptively configures the merge candidate list of a current block according to a merge estimation region (MER), the merge candidate list of a current block may be adaptively configured according to a merge estimation region (MER). In this case, adaptively configuring the merge candidate list includes removing an existing merge candidate from a list or adding an additional merge candidate to a list according to whether to belong to the same merge estimation region as a block which is spatially or temporally adjacent to a current block.

In addition, in configuring the merge candidate list of a current block according to a merge estimation region (MER), the additional merge candidate may utilize motion information of a block spatially separated from a current block by a distance of a plurality of pixels.

A video coding method and device according to the present disclosure is about transform encoding and decoding among video coding technologies, a method and a device transforming and/or inversely transforming only some residual signals of one square or non-square block are included.

A video coding method and device according to the present disclosure is about a method and a device which store a motion vector and a reference image index in video encoding and decoding and use a motion vector and a reference image used around a block and in a previous image in decoding and encoding afterwards, among video coding technologies.

MODE FOR INVENTION

Referring to a diagram attached in this description, an embodiment of the present disclosure is described in detail so that a person with ordinary skill in the art to which the inventions pertain may easily carry it out. But, the present disclosure may be implemented in a variety of different shapes and is not limited to an embodiment which is described herein. And, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, the order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in the second embodiment.

In addition, as construction units shown in an embodiment of the present disclosure are independently shown to represent different characteristic functions, it does not mean that each construction unit is configured in separate hardware or one software construction unit. In other words, each construction unit may be described by being enumerated as each construction unit for convenience of description, at least two construction units among each construction unit may be combined to configure one construction unit or one construction unit may be divided into a plurality of construction units to perform a function. Such an integrated embodiment and separated embodiment in each construction unit are also included in a scope of a right on the present disclosure as long as they are not beyond the essence of the present disclosure.

First, a term used in this application is simply described as follows.

A decoding device (Video Decoding Apparatus) which will be described after may be a device included in a server terminal such as a private security camera, a private security system, a military security camera, a military security system, a personal computer (PC), a notebook, a portable multimedia player (PMP), a wireless communication terminal, a smart phone, a TV application server and a service server, etc. and mean various devices equipped with a user terminal such as all kinds of instruments, etc., a communication device such as a communication modem, etc. for communicating with an wire and wireless communication network, a memory for storing all kinds of programs and data for inter or intra prediction to encode or decode an image, a microprocessor for program operation and control by running it and so on.

In addition, an image encoded in a bitstream by an encoder may be transmitted to an image decoding device through a wire and wireless communication network, etc. such as the Internet, a wireless local area network, a wireless Lan network, a wibro network, a mobile radio communication network, etc. or through various communication interfaces such as a cable, an universal serial bus, etc. in real-time or in non-real-time and may be decoded. And it may be reconstructed into an image and played. Alternatively, a bitstream generated by an encoder may be stored in a memory. The memory may include both a volatile memory and a nonvolatile memory. In this description, a memory may be represented as a recording medium which stores a bitstream.

Generally, a video may be configured with a series of pictures and each picture may be partitioned into a coding unit like a block. In addition, a person with ordinary skill in the art to which the embodiment pertains may understand that a term 'picture' described below may be used by being substituted for other terms with the same meaning such as Image, Frame, etc. And, a person with ordinary skill in the art to which the embodiment pertains may understand that a term 'coding unit' may be used by being substituted for other terms with the same meaning such as a unit block, a block, etc.

Hereinafter, referring to the attached diagrams, an embodiment of the present disclosure will be described in more detail. In describing the present disclosure, overlapping description for the same component is omitted.

FIG. 1 is a block diagram showing an image encoding device according to the present disclosure.

In reference to FIG. 1, an image encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

A picture partition unit 110 may partition an input picture into at least one processing unit. In this case, a processing unit may be a prediction unit (PU), a transform unit (TU) or a coding unit (CU). Hereinafter, in an embodiment of the present disclosure, a coding unit may be used as a unit performing encoding and may be used as a unit performing decoding.

A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N.

A prediction unit 120 and 125 may include an inter prediction unit 120 performing inter prediction and an intra prediction unit 125 performing intra prediction. Whether to perform inter prediction or intra prediction for a prediction unit may be determined and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder. An intra prediction method will be described in detail by referring to FIG. 3 and an inter prediction method will be described in detail by referring to FIGS. 4 to 7, respectively.

In applying the above-mentioned block merge technology of the present disclosure, a method of using a merge estimation region (MER) by considering a parallel processing may be applied to a prediction unit 120 and 125 when a current block is used by merging motion information of a block which is spatially or temporally adjacent. In other words, the present disclosure may utilize a parallel estimation region (PER) for configuring a block which is spatially or temporally adjacent to a current block by considering a parallel processing in a prediction technology such as inter prediction, intra prediction, inter-component prediction, etc. among video coding technologies.

An inter prediction unit 120 may predict a prediction unit based on information of at least one picture of a previous picture or a subsequent picture of a current picture and may predict a prediction unit based on information of a partial region which is encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information below an integer pixel may be generated in a reference picture. For a luma pixel, a DCT-based 8-tap interpolation filter with a different filter coefficient may be used to generate pixel information below an integer pixel in a ¼ pixel unit. For a chroma signal, a DCT-based 4-tap interpolation filter with a different filter coefficient may be used to generate pixel information below an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip method, a merge method, a AMVP (Advanced Motion Vector Prediction) method, an intra block copy method, etc. may be used.

An intra prediction unit 125 may generate a prediction unit based on reference pixel information around a current block, pixel information in a current picture. When a reference pixel is a pixel which performed inter prediction because a surrounding block in a current prediction unit is a block which performed inter prediction, a reference pixel included in a block which performed inter prediction may be used by being substituted with reference pixel information of a block which performed surrounding intra prediction. In other words, when a reference pixel is unavailable, unavailable reference pixel information may be used by being substituted with at least one reference pixel of available reference pixels.

In addition, a residual block including residual value information, a difference value between a prediction unit which performs prediction based on a prediction unit generated in a prediction unit 120 and 125 and an original block in a prediction unit, may be generated. A generated residual block may be input into a transform unit 130.

In a transform unit 130, an original block and a residual block including residual value information in a prediction unit generated in a prediction unit 120 and 125 may be transformed by using a transform method such as DST (Discrete Cosine Transform), DST (Discrete Sine Transform), KLT. Whether to apply DCT, DST or KLT to transform a residual block may be determined based on intra prediction mode information in a prediction unit used to generate a residual block. A transform method will be described in detail by referring to FIGS. 8 to 10.

A quantization unit 135 may quantize values which are transformed into a frequency domain in a transform unit 130. According to a block or according to image importance, a quantized coefficient may be changed. A value calculated in a quantization unit 135 may be provided to a dequantization unit 140 and a rearrangement unit 160.

A rearrangement unit 160 may perform the rearrangement of a coefficient value for a quantized residual value.

A rearrangement unit 160 may change a two-dimensional block-shaped coefficient into a one-dimensional vector shape through a coefficient scanning method. For example, in a rearrangement unit 160, a DC coefficient to a coefficient in a high frequency domain may be scanned by a zig-zag scanning method and may be changed into a one-dimensional vector shape. A vertical scan which scans a two-dimensional block-shaped coefficient by column or a horizontal scan which scans a two-dimensional block-shaped coefficient by row may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various coding methods such as Exponential Golomb, CAVLC (Context-Adaptive Variable Length Coding), CABAC (Context-Adaptive Binary Arithmetic Coding). Regarding it, an entropy encoding unit 165 may encode residual value coefficient information in a coding unit from a rearrangement unit 160 and a prediction unit 120, 125. In addition, according to the present disclosure, it is possible to signal and transmit information indicating that motion information is derived in terms of a decoder and used and information on a method used for deriving motion information.

In a dequantization unit 140 and an inverse transform unit 145, values quantized in a quantization unit 135 are dequantized and values transformed in a transform unit 130 are inversely transformed. A residual value generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit and ALF (Adaptive Loop Filter). A deblocking filter may remove block distortion generated by a boundary between blocks in a reconstructed picture. An offset modification unit may modify an offset with an original image in a pixel unit for an image performing deblocking. A method in which a pixel included in an image is divided into the certain number of regions, a region which will perform an offset is determined and an offset is applied to the corresponding region or a method in which an offset is applied by considering edge information of each pixel may be used to perform offset modification for a specific picture. ALF (Adaptive Loop Filter) may be performed based on a value comparing a filtered reconstructed image with an original image. A pixel included in an image may be divided into a predetermined group, one filter which will be applied to the corresponding group may be determined and a filtering may be performed discriminately per group.

A memory 155 may store a reconstructed block or picture calculated in a filter unit 150 and a stored reconstructed block or picture may be provided for a prediction unit 120 and 125 when inter prediction is performed.

Figure 2:
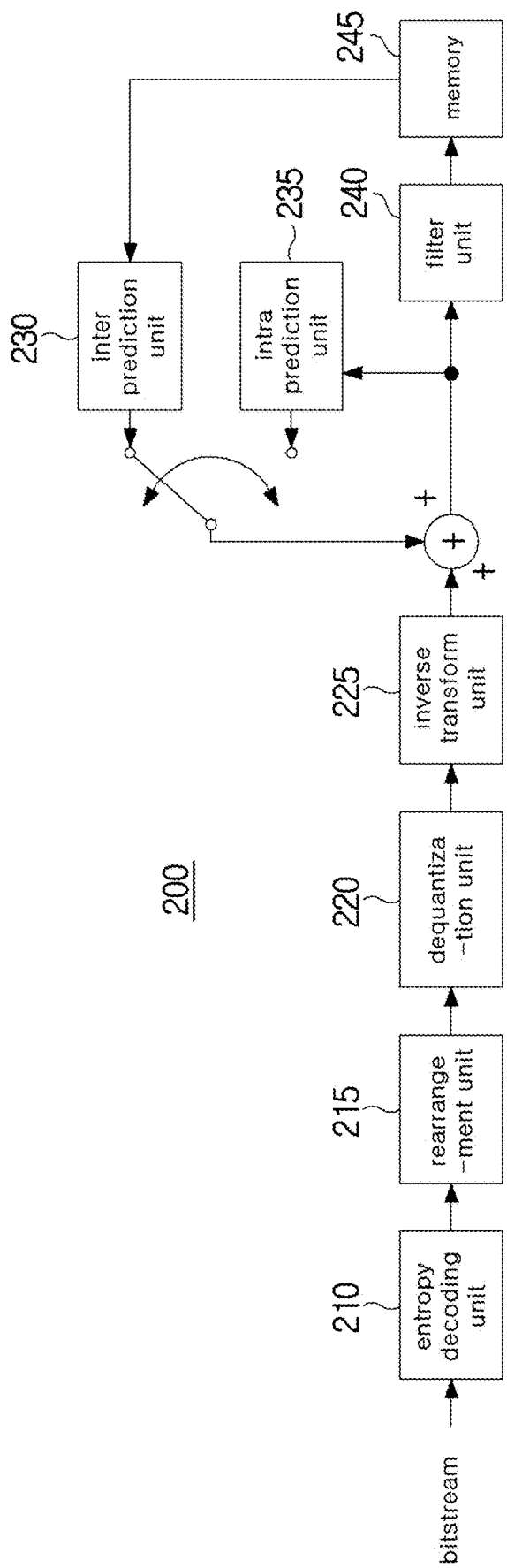
FIG. 2 is a block diagram showing an image decoding device according to the present disclosure.

FIG. 2 is a block diagram showing an image decoding device according to the present disclosure.

In reference to FIG. 2, an image decoder 200 may include an entropy decoding unit 210, a rearrangement unit 215, a dequantization unit 220, an inverse transform unit 225, a prediction unit 230 and 235, a filter unit 240 and a memory 245.

When an image bitstream is input in an image encoder, an input bitstream may be decoded in a process opposite to that of an image encoder.

An entropy decoding unit 210 may perform entropy decoding in a process opposite to a process in which entropy encoding is performed in an entropy encoding unit of an image encoder. For example, in response to a method performed in an image encoder, various methods such as Exponential Golomb, CAVLC (Context-Adaptive Variable Length Coding) and CABAC (Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210, based on a rearrangement method of an encoding unit. Coefficients represented in a one-dimensional vector shape may be reconstructed into coefficients in a two-dimensional block shape and may be rearranged.

A dequantization unit 220 may perform dequantization based on a quantization parameter provided in an encoder and a coefficient value of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc. An inverse transform method will be described in detail by referring to FIGS. 8 to 10.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as operation in an image encoder, intra prediction for a prediction unit may be performed based on a pixel at the left of a prediction unit, a pixel at the left top and a pixel at the top, but when the size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction.

In addition, in applying the above-mentioned block merge technology of the present disclosure, a method of using a merge estimation region by considering a parallel processing may be applied to a prediction unit 230 and 235 when a current block is used by merging motion information of a block which is spatially or temporally adjacent. In other words, the present disclosure may utilize a parallel estimation region for configuring a block which is spatially or temporally adjacent to a current block by considering a parallel processing in a prediction technology such as inter prediction, intra prediction, inter-component prediction, etc. among video coding technologies.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode or an intra block copy mode may be determined. An inter prediction method will be described in detail by referring to FIG. 4 to FIG. 7, respectively.

An intra prediction unit 235 may generate a prediction block based on pixel information in a current picture. When a prediction unit is a prediction unit which performs intra prediction, intra prediction may be performed based on intra prediction mode information in a prediction unit provided by an image encoder. An intra prediction unit 235 may include an adaptive intra smoothing (AIS) filter, a reference pixel interpolation unit and a DC filter. As a part performing filtering on the reference pixel of a current block, an AIS filter may be applied by determining whether a filter is applied according to a prediction mode in a current prediction unit. AIS filtering may be performed on the reference pixel of a current block by using a prediction mode in a prediction unit and AIS filter information provided by an image encoder. When the prediction mode of a current block is a mode where AIS filtering is not performed, an AIS filter may not be applied.

When a prediction mode in a prediction unit is a prediction unit in which intra prediction is performed based on a pixel value interpolating a reference pixel, a reference pixel interpolation unit may interpolate a reference pixel to generate a reference pixel in a pixel unit below an integer value. When a prediction mode in a current prediction unit is a prediction mode which generates a prediction block without interpolating a reference pixel, a reference pixel may not be interpolated. A DC filter may generate a prediction block through filtering when the prediction mode of a current block is a DC mode. An intra prediction method will be described in detail by referring to FIG. 3.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoder. A deblocking filter of an image decoder may receive information related to a deblocking filter provided by man image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and provide a reconstructed picture to an output unit.

Figure 3:
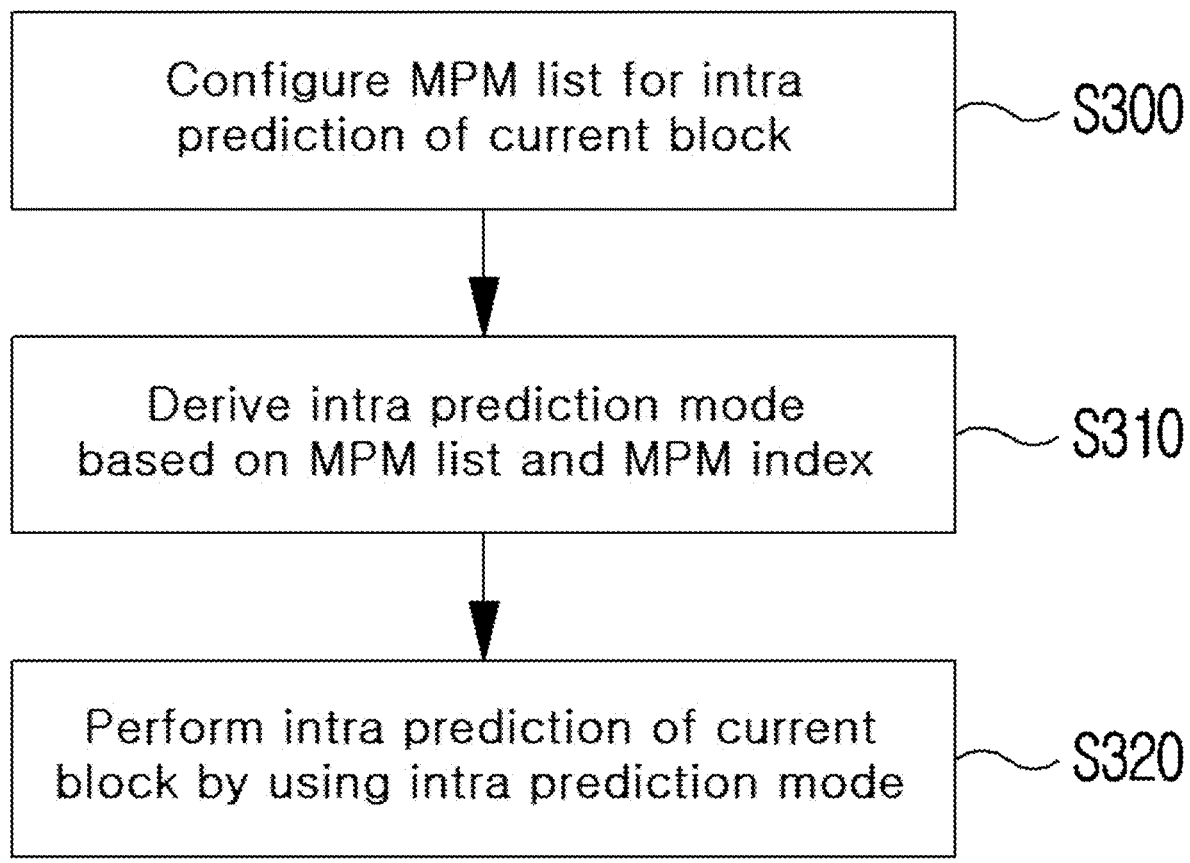
FIG. 3 shows an intra prediction method based on MPM (most probable mode) as an embodiment to which the present disclosure is applied.

FIG. 3 shows an intra prediction method based on MPM (most probable mode) as an embodiment to which the present disclosure is applied.

In reference to FIG. 3, a MPM list for the intra prediction of a current block may be configured S300.

A MPM list of the present disclosure may include a plurality of MPMs and MPMs may be determined based on the intra prediction mode of a neighboring block of a current block. The number of MPMs may be n and n may be an integer such as 3, 4, 5, 6 or more.

For example, a MPM list may include at least one of an intra prediction mode of a neighboring block (modeA), (modeA−i), (modeA+i) or a default mode. A value of i may be an integer such as 1, 2, 3, 4 or more. The neighboring block may mean a block adjacent to the left and/or top of a current block. A default mode may be at least one of a Planar mode, a DC mode or a predetermined directional mode. A predetermined directional mode may include at least one of a horizontal mode (modeV), a vertical mode (modeH), (modeV−j), (modeV+j), (modeH−j) or (modeH+j). A value of j may be an arbitrary natural number less than or equal to 16.

An intra prediction mode may be derived based on the MPM list and a MPM index S310.

The MPM index may specify the same MPM as an intra prediction mode of a luma component block in a MPM list. A MPM specified by a MPM index may be set as an intra prediction mode of a current block.

Alternatively, the intra prediction mode of a current block may be derived by applying a predetermined offset to a MPM specified by the MPM index.

Applying the offset may be selectively performed based on at least one of block attributes, i.e., a size, a shape, partition information, partition depth, a value of an intra prediction mode or a component type. In this case, a block may mean the current block and/or a neighboring block of a current block.

The offset may be applied only when a size of a current block is smaller than or the same as a predetermined first threshold value. In this case, the first threshold value may mean the maximum block size to which an offset is applied. Alternatively, it may be applied only when the size of a current block is greater than or the same as a predetermined second threshold value. In this case, the second threshold value may mean the minimum block size to which an offset is applied. The first/second threshold value may be signaled through a bitstream. Alternatively, it may be variably determined in a decoding device based on at least one of the above-mentioned block attributes, and may be a fixed value which is pre-promised in an encoding/decoding device.

Alternatively, the offset may be applied only when the shape of a current block is non-square. In an example, when the following conditions are satisfied, IntraPredMode, an intra prediction mode of a current block, may be derived by adding a predetermined offset (e.g., 65) to the MPM.

nW is greater than nH
IntraPredMode is greater than or equal to 2
IntraPredMode is less than (whRatio>1)? (8+2*whRatio): 8

In this case, nW and nH may represent the width and height of a current block, respectively and whRatio may be set as Abs(Log 2 (nW/nH)).

Alternatively, when the following conditions are satisfied, IntraPredMode of a current block may be derived by subtracting a predetermined offset (e.g., 67) from the MPM.

nH is greater than nW
IntraPredMode is greater than or equal to 66
IntraPredMode is less than (whRatio>1)? (60−2*whRatio): 60

By using the intra prediction mode, the intra prediction of a current block may be performed S320.

Concretely, a prediction sample of a current block may be derived by using a reference sample specified by an intra prediction mode. In this case, a current block may be partitioned into a plurality of sub-blocks and intra prediction may be performed in a unit of each sub-block. Each sub-block may be predicted in parallel and may be predicted/reconstructed sequentially according to the predetermined coding order.

Partition into the sub-blocks may be performed based on predetermined partition information. The partition information may include at least one of first information representing whether a current block is partitioned into a plurality of sub-blocks, second information representing a partition direction (e.g., horizontal or vertical) or third information on the number of partitioned sub-blocks. The partition information may be encoded in an encoding device and signaled. Alternatively, some of the partition information may be variably determined, in a decoding device, based on the above-mentioned block attributes, and may be set as a fixed value which is predefined in an encoding/decoding device.

For example, when the first information is a first value, a current block may be partitioned into a plurality of sub-blocks and otherwise, a current block may not be partitioned into a plurality of sub-blocks (NO_SPLIT). When a current block is partitioned into a plurality of sub-blocks, a current block may be horizontally partitioned (HOR_SPLIT) or vertically partitioned (VER_SPLIT) based on the second information. In this case, a current block may be partitioned into r sub-blocks. In this case, a value of r may be an integer such as 2, 3, 4 or more. Alternatively, a value of r may be limited to exponentiation of 2 such as 1, 2, 4, etc. Alternatively, when at least one of width or height of a current block is 4 (e.g., 4×8, 8×4), the k may be set to be 2 and otherwise, the k may be set to be 4, 8, or 16. When a current block is not partitioned (NO_SPLIT), the k may be set to be 1.

The current block may be partitioned into sub-blocks with the same width and height, and may be partitioned into sub-blocks with different width and height. A current block may be partitioned in a pre-promised N×M block unit (e.g., 2×2, 2×4, 4×4, 8×4, 8×8, etc.) in an encoding/decoding device regardless of the above-mentioned block attributes.

Figure 4:
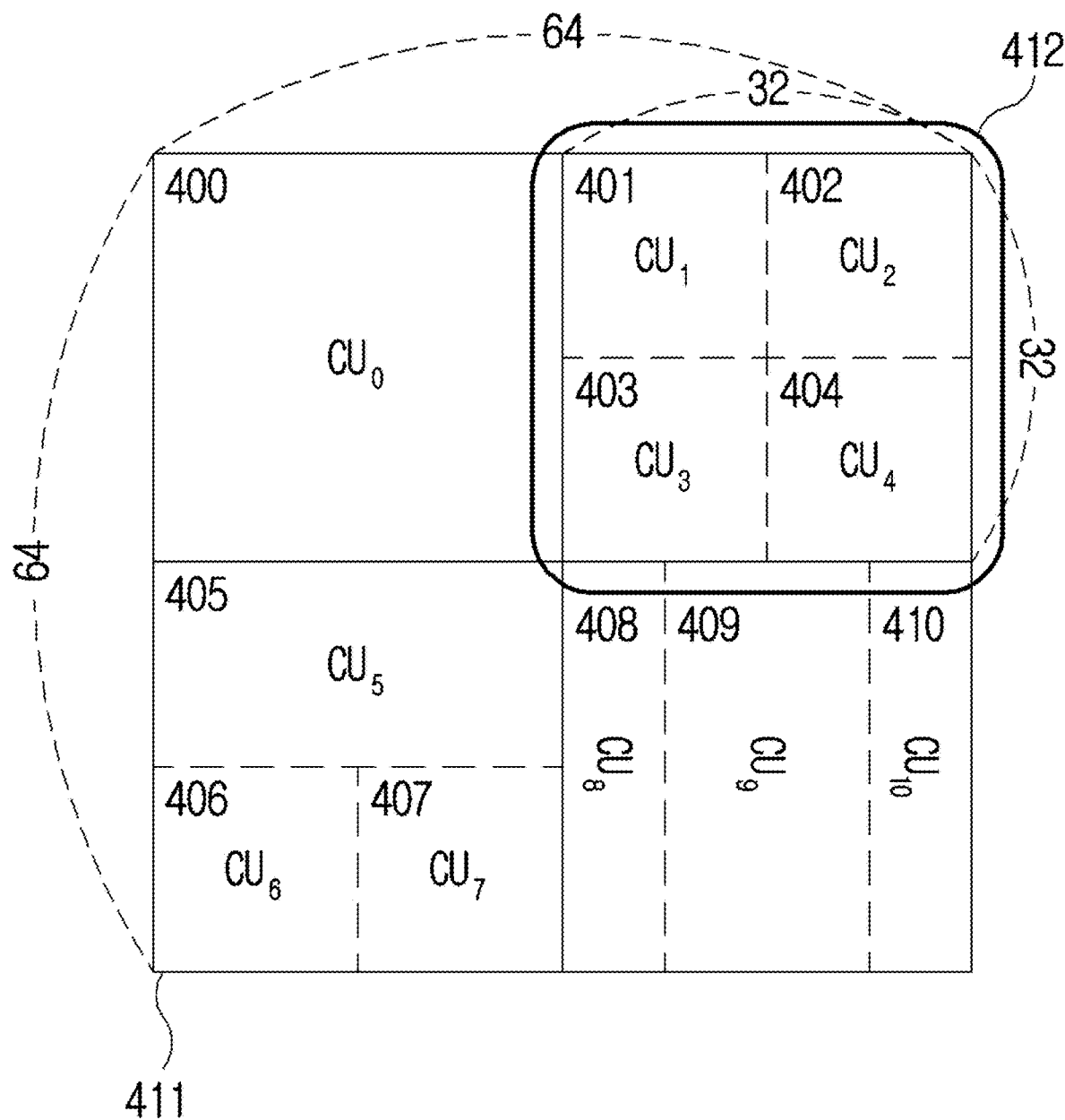
FIG. 4 shows an inter prediction method based on a merge estimation region (MER) as an embodiment to which the present disclosure is applied.

FIG. 4 shows an inter prediction method based on a merge estimation region (MER) as an embodiment to which the present disclosure is applied.

The present disclosure is about a block merge technology for inter prediction among video coding technologies. A current block may be predicted by merging with motion information of at least one of a spatial neighboring block or a temporal neighboring block. The prediction may be performed based on a merge estimation region for a parallel processing.

In addition, the present disclosure suggests a parallel estimation region (PER) for configuring a neighboring block of a current block in a prediction method such as inter prediction, intra prediction, inter-component prediction, etc. among video coding technologies. The neighboring block may mean a region which is spatially and/or temporally adjacent to a current block. One or more blocks belonging to the parallel estimation region (PER) may be processed in parallel.

In a block merge technology of the present disclosure, a merge candidate list of a current block may be adaptively configured according to a merge estimation region (MER). In this case, the merge candidate list may be configured by removing an existing merge candidate from a list or adding an additional merge candidate to a list according to whether to belong to the same merge estimation region as a neighboring block of a current block.

In a block merge technology of the present disclosure, when the merge candidate list of a current block is configured according to a merge estimation region, the additional merge candidate may be a block spatially separated from a current block by a distance of a plurality of pixels.

When prediction candidates of a current block of the present disclosure are configured, a prediction candidate which is spatially and/or temporally adjacent by considering a parallel estimation region (PER) may be a block spatially separated from a current block by a distance of a plurality of pixels or a block temporally positioned at a specific picture distance or farther.

In a video coding method and device suggested in the present disclosure, a parallel estimation region (PER) may be used to configure a reference pixel for inter-component prediction, a template for template matching, a motion reference block for inter prediction, etc.

FIG. 4 shows a plurality of coding units configuring one block and various block partition structures.

Among a plurality of coding units configuring one block, a merge estimation region for a parallel processing may be set. The coding units in the merge estimation region do not have interdependency and the corresponding coding units may be processed in parallel. In reference to FIG. 4, the concept of a merge estimation region (MER) will be described.

In FIG. 4, a 64×64 block 411 may be partitioned into a plurality of coding units. The partition may be performed by using at least one partition method of quad-tree block partition, binary-tree block partition or ternary-tree block partition. The partition may be recursively performed.

When a 64×64 block 411 is partitioned into a total of 11 coding units 400~410 by using the block partition to perform encoding and/or decoding, FIG. 4 shows an example of setting a merge estimation region (MER) suggested by the present disclosure. In this case, in an example shown in FIG. 4, a merge estimation region is configured with a 32×32 pixel region 412, and encoding and/or decoding is performed by removing every reference dependency so that there will be no dependency between coding units in the corresponding region.

When the corresponding region is a merge estimation region (MER), a coding unit in the same merge estimation region in a process of generating each block merge candidate list for CU1, CU2, CU3, CU4 is not added as a merge candidate.

The present disclosure includes adding a block outside the corresponding merge estimation region as a merge candidate instead of not adding a coding unit in the same merge estimation region in a process of generating the merge candidate list as a merge candidate. It will be described in detail by referring to FIG. 5 to FIG. 7.

In addition, when the corresponding region is a parallel estimation region, reference pixels used for inter-component prediction, template prediction, etc. for CU1, CU2, CU3, CU4 are configured by using pixels outside the corresponding parallel estimation region.

Alternatively, all or some of coding units belonging to a merge estimation region may share one merge candidate list. The merge candidate of a current block may include a spatial/temporal neighboring block of a merge estimation region. In this case, a current block may mean any one of a plurality of coding units belonging to a merge estimation region, and may mean a coding unit which is no longer partitioned into a smaller coding unit. A merge estimation region may be a higher block (or a higher coding unit) having a partition depth (split depth) smaller than a current block. For example, when the split depth of a current block is k, the split depth of a merge estimation region may be (k−1), (k−2), (k−3), etc. A current block may be obtained by partitioning a merge estimation region based on any one of the above-mentioned partition methods. Alternatively, a current block may be obtained by partitioning a merge estimation region based on at least two of the above-mentioned partition methods.

Generally, the merge candidate of a current block may be determined as a neighboring block adjacent to at least one of the left, the bottom-left, the top, the top-right or the top-left of a current block. It is assumed that the position of a top-left sample of a current block is (xc, yc) and the width and height of a current block is Wc and Hc, respectively. In this case, a left neighboring block may be a block including a (xc-1, yc+Hc-1) sample, a bottom-left neighboring block may be a block including a (xc-1,yc+Hc) sample, a top neighboring block may be a block including a (xc+Wc-1,yc-1) sample, a top-right neighboring block may be a block including a (xc+Wc,yc-1) sample and a top-left neighboring block may be a block including a (xc-1,yc-1) sample.

But, when a current block belongs to a merge estimation region, the merge candidate of a current block may be determined as a neighboring block adjacent to at least one of the left, the bottom-left, the top, the top-right or the top-left of a merge estimation region. It is assumed that the position of a top-left sample of the merge estimation region is (xs, ys) and the width and height of the merge estimation region is Ws and Hs, respectively. In this case, a left neighboring block may be a block including a (xs-1,ys+Hs-1) sample, a bottom-left neighboring block may be a block including a (xs-1,ys+Hs) sample, a top neighboring block may be a block including a (xs+Ws-1,ys-1) sample, a top-right neighboring block may be a block including a (xs+Ws,ys-1) sample and a top-left neighboring block may be a block including a (xs-1,ys-1) sample.

In the above-mentioned method, a coding unit belonging to a merge estimation region may use the same merge candidate or merge candidate list. For this, when a current block belongs to a merge estimation region, the above-mentioned position/size information of a current block may be set as position/size information of a merge estimation region. Based on set position/size information, the merge candidate of a current block may be derived. Based on a derived merge candidate, the merge candidate list of a current block may be configured.

Based on the merge candidate list and a merge candidate index, motion information of a current block may be derived. A merge candidate index may specify any one of a plurality of merge candidates belonging to the merge candidate list and specify a merge candidate having motion information of a current block. The merge candidate index may be signaled for each coding unit belonging to a merge estimation region.

Hereinafter, a method of setting a merge estimation region (MER) will be described.

When the split depth of a current block is k, a higher block to which a current block belongs is a block with a split depth of (k−i) and in this case, i may be 1, 2, . . . , k−1, k. A higher block which satisfies a predetermined condition among the higher blocks may be set as a merge estimation region. In other words, a merge estimation region may be defined as a higher block of a node sharing a merge candidate or a merge candidate list. But, when there are a plurality of higher blocks which satisfy a predetermined condition, a higher block with the smallest split depth may be set as a merge estimation region or a higher block with the largest split depth may be set as a merge estimation region.

In an example, when the number of samples belonging to a higher block is smaller than or the same as a predetermined first threshold value, the higher block may be set as a merge estimation region. The first threshold value may be signaled from an encoding device and the signaling may be performed in at least one level of a video sequence, a picture, a slice, a tile or CTU. Alternatively, the first threshold value may be a fixed value which is predefined in an encoding/decoding device. The first threshold value may be 32, 64, 128, 256 or more.

Alternatively, when a higher block is partitioned into two based on binary-tree block partition and the number of samples belonging to a higher block is smaller than or the same as a predetermined second threshold value, the corresponding higher block may be set as a merge estimation region. The second threshold value may be signaled from an encoding device and the signaling may be performed in at least one level of a video sequence, a picture, a slice, a tile or CTU. Alternatively, the second threshold value may be a fixed value which is predefined in an encoding/decoding device. The second threshold value may be 32, 64, 128, 256 or more.

For example, it is assumed that the second threshold value is 64 and a higher block is 4×8. In this case, when a higher block is partitioned into two based on binary-tree block partition, a higher block may be configured with two 4×4 lower blocks. It may mean that there is a lower block in which the number of samples is smaller than 32 in the higher block. When the number of samples belonging to a higher block is smaller than 64 and there is a lower block in which the number of samples is smaller than 32, the higher block may be set as a merge estimation region and two lower blocks belonging to the higher block may share one merge candidate list. Alternatively, when a higher block is partitioned into three based on ternary-tree block partition and the number of samples belonging to a higher block is smaller than or the same as a predetermined third threshold value, the corresponding higher block may be set as a merge estimation region. The third threshold value may be signaled from an encoding device and the signaling may be performed in at least one level of a video sequence, a picture, a slice, a tile or CTU. Alternatively, the third threshold value may be a fixed value which is predefined in an encoding/decoding device. The third threshold value may be 32, 64, 128, 256 or more.

For example, it is assumed that the third threshold value is 128 and a higher block is 4×16. In this case, when a higher block is partitioned into three based on ternary-tree block partition, a higher block may be configured with two 4×4 lower blocks and one 4×8 lower block. It may mean that there is a lower block in which the number of samples is smaller than 32 in the higher block. When the number of samples belonging to a higher block is smaller than 128 and there is a lower block in which the number of samples is smaller than 32, the higher block may be set as a merge estimation region and three lower blocks belonging to the higher block may share one merge candidate list.

Alternatively, when a higher block is partitioned into four based on quad-tree block partition and the number of samples belonging to a higher block is smaller than or the same as a predetermined fourth threshold value, the corresponding higher block may be set as a merge estimation region. The fourth threshold value may be signaled from an encoding device and the signaling may be performed in at least one level of a video sequence, a picture, a slice, a tile or CTU. Alternatively, the fourth threshold value may be a fixed value which is predefined in an encoding/decoding device. The fourth threshold value may be 32, 64, 128, 256 or more.

For example, it is assumed that the fourth threshold value is 128 and a higher block is 8×8. In this case, when a higher block is partitioned into four based on quad-tree block partition, a higher block may be configured with four 4×4 lower blocks. It may mean that there is a lower block in which the number of samples is smaller than 32 in the higher block. When the number of samples belonging to a higher block is smaller than 128 and there is a lower block in which the number of samples is smaller than 32, the higher block may be set as a merge estimation region and four lower blocks belonging to the higher block may share one merge candidate list.

Alternatively, only when a ratio of width and height of a higher block (W/H or H/W) is smaller than or the same as a predetermined fifth threshold value, the corresponding higher block may be set as a merge estimation region. The fifth threshold value may be signaled from an encoding device and the signaling may be performed in at least one level of a video sequence, a picture, a slice, a tile or CTU. Alternatively, the fifth threshold value may be a fixed value which is predefined in an encoding/decoding device. The fifth threshold value may be 2, 4, 8, 16 or more. For example, when a higher block is a 32×4 block and the fifth threshold value is 4, the higher block may not be set as a merge estimation region. When a higher block is a 4×32 block and the fifth threshold value is 8, the higher block may be set as a merge estimation region.

Alternatively, only when any one of width and height of a higher block is smaller than or the same as a predetermined sixth threshold value, the corresponding higher block may be set as a merge estimation region. In this case, the maximum value of width and height of a higher block may be compared with the sixth threshold value. The sixth threshold value may be signaled from an encoding device and the signaling may be performed in at least one level of a video sequence, a picture, a slice, a tile or CTU. Alternatively, the sixth threshold value may be a fixed value which is predefined in an encoding/decoding device. The sixth threshold value may be 16, 32, 64 or more. For example, when a higher block is a 32×4 block and the sixth threshold value is 16, the higher block may not be set as a merge estimation region. When a higher block is a 4×16 block and the sixth threshold value is 32, the higher block may be set as a merge estimation region.

Alternatively, when the number of samples belonging to a higher block is smaller than or the same as a seventh threshold value and there is at least one lower block in which the number of samples is smaller than p in the higher block, the higher block may be set as a merge estimation region. The seventh threshold value may be signaled from an encoding device and the signaling may be performed in at least one level of a video sequence, a picture, a slice, a tile or CTU. Alternatively, the seventh threshold value may be a fixed value which is predefined in an encoding/decoding device. The seventh threshold value may be 32, 64, 128 or more. The p may be 16, 32, 64 or more. The lower block may be determined by partitioning the higher block based on at least one of the above-mentioned partition methods.

A merge estimation region may be set based on any one of the above-mentioned conditions. Alternatively, a merge estimation region may be set based on a combination of at least two conditions.

When a higher block is partitioned by a predetermined partition method, the corresponding higher block may be limited so that it is not set as a merge estimation region. In this case, a predetermined partition method may include at least one of quad-tree block partition, binary-tree block partition or ternary-tree block partition. For example, when a higher block is partitioned based on quad-tree block partition, the corresponding higher block may not be set as a merge estimation region. Inversely, only when a higher block is partitioned by a predetermined partition method, the corresponding higher block may be limited so that it is set as a merge estimation region. For example, only when a higher block is partitioned based on binary-tree block partition and/or ternary-tree block partition, the corresponding higher block may be set as a merge estimation region.

As mentioned above, a merge estimation region may be determined by considering only a size/shape of a higher block. Alternatively, a merge estimation region may be determined by considering a size/shape of a higher block and a lower block. But, it is not limited thereto and a merge estimation region may be determined by considering only a size/shape of a lower block.

An encoding device may determine the optimum size of a merge estimation region and encode information representing a determined size to signal it to a decoding device. The encoded information may be signaled in at least one level of a video sequence, a picture, a slice, a tile or CTU. Alternatively, the size of a merge estimation region may be a fixed size which is predefined in an encoding/decoding device.

Alternatively, a merge estimation region may not be limited to a square shape, and information on width and height of a merge estimation region may be independently signaled. A merge estimation region may have a non-square shape that the width and height are different from each other. Alternatively, for the size or range of a merge estimation region, using a predefined size or range may be also included in a scope of the present disclosure.

An embodiment on the above-mentioned merge estimation region (MER) may be equally/similarly applied to a parallel estimation region and detailed description will be omitted.

Figure 5:
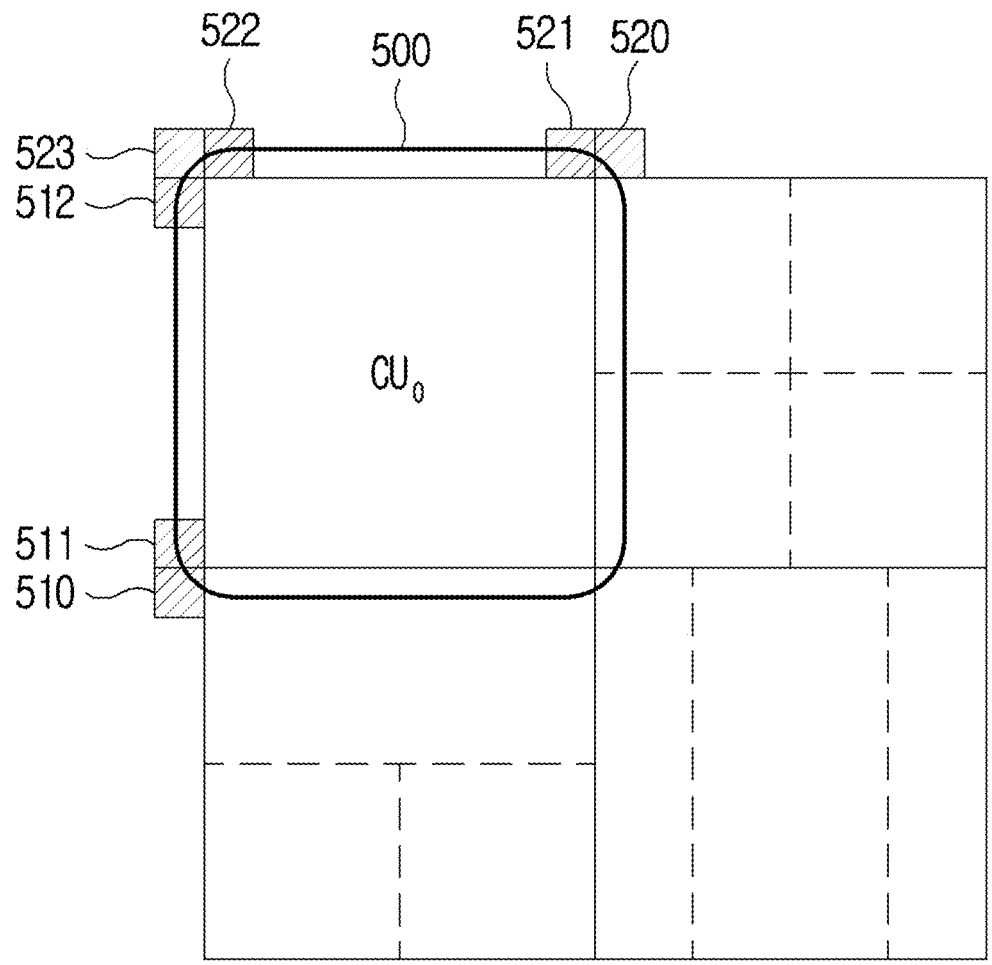
FIG. 5 is an example on CU with the same size as MER.

FIG. 5 is an example on CU with the same size as MER.

FIG. 5 is a diagram showing merge candidates which are spatially adjacent to CU with the same size as MER.

As in FIG. 5, for CU with the same size as MER or with a larger size than MER, a process of excluding merge candidates which are spatially adjacent in a process of generating a merge candidate list is not included.

In addition, the corresponding concept may be applied to a parallel estimation region (PER) as well as MER shown in FIG. 5.

FIG. 5 is a diagram showing merge candidates which are spatially adjacent to CU 500 with the same size as MER.

As in FIG. 5, for CU with the same size as MER or with a larger size than MER, a process of excluding merge candidates which are spatially adjacent in a process of generating a merge candidate list is not included.

Motion information corresponding to a position of the left 510, 511 and 512 and a position of the top 520, 521, 522 and 523 may be used as merge candidates which are spatially adjacent to CU 500 with the same size as MER shown in FIG. 5.

In this case, as a current CU 500 has the same size as MER, as mentioned above, a process of excluding the corresponding merge candidates in a process of generating a merge candidate list with the merge candidates which are spatially adjacent is not performed.

But, when there is no motion information, i.e., when being a block encoded in an intra prediction mode or when being positioned on the boundary of a picture, a slice or a tile, motion information at the corresponding position may not be included as a merge candidate.

Figure 6:
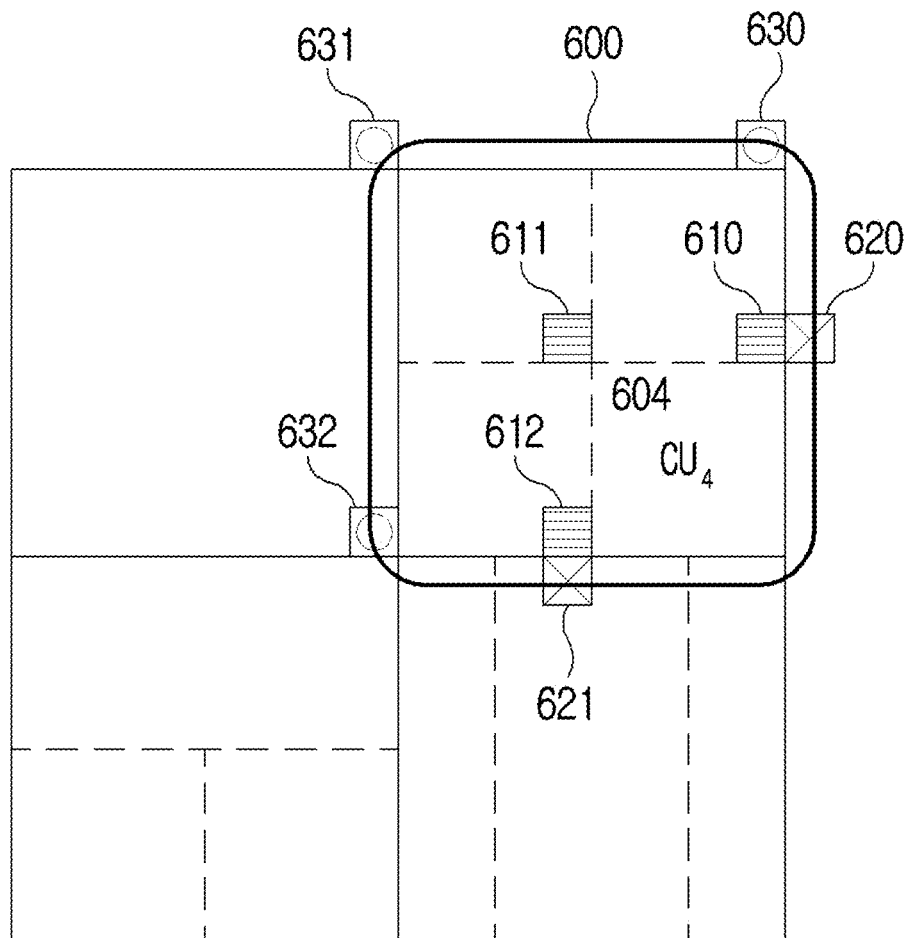
FIG. 6 is a diagram showing an embodiment on CU with a smaller size than MER.

FIG. 6 is a diagram showing an embodiment on CU with a smaller size than MER.

FIG. 6 is a diagram showing an example on CU 604 using a merge candidate at a position included in the same MER among a plurality of CUs with a smaller size than MER.

In addition, as shown in FIG. 6, it is suggested in the present disclosure that when a merge candidate included in the same MER is excluded, a spatially-separated position by a distance of a plurality of pixels outside MER for compensating it is used as an additional merge candidate.

As FIG. 6 is a diagram showing an embodiment on CU 604 with a smaller size than MER, 604 CU is described as an embodiment to show that a merge candidate at a position included in the same MER among a plurality of CUs 601, 602, 603 and 604 with a smaller size than MER is excluded in FIG. 6.

When a spatially adjacent merge candidate of a current CU 604 exists like 610, 611, 621, 620 and 621 in FIG. 6, merge candidates 620 and 621 at a position which is not encoded and decoded yet in encoding and decoding a current CU are excluded from a merge candidate.

In addition, merge candidates 610, 611 and 612 included in the same MER as a current CU among the spatially adjacent merge candidates of the current CU 604 are not added to a list in a process of generating a merge candidate list.

In case of an embodiment corresponding to the current CU 604, loss occurs in a process of configuring a spatially adjacent merge candidate because spatially adjacent merge candidates are included in the same MER 600 and excluded in a process of configuring a merge candidate list as a case of being excluded by the encoding and decoding order.

To solve it, the present disclosure suggests a method of configuring a merge candidate list which uses a merge candidate spatially positioned at a distance of a plurality of pixels as an additional merge candidate. In this case, as an embodiment in which a merge candidate positioned at a distance of a plurality of pixels is used as an additional merge candidate, both a case that it is used when a merge candidate list is not satisfied as many as the maximum number of merge candidates and a case that it is used when merge candidates included in the same MER are excluded may be included.

As shown in FIG. 6, merge candidates 630, 631 and 632, which are positioned at a specific pixel distance and have a specific directionality with merge candidates 610, 611 and 612 included in the same MER 600 as a current CU, may be used as an additional merge candidate.

According to an embodiment, a merge candidate 630 positioned in a vertical direction of a merge candidate 610 included in the same MER as a current CU and positioned at a different MER may be added to the merge candidate list of a current CU.

In addition, according to an embodiment, a merge candidate 631 positioned in a diagonal direction of a merge candidate 611 included in the same MER as a current CU and positioned at a different MER may be added to the merge candidate list of a current CU.

In addition, according to an embodiment, a merge candidate 632 positioned in a diagonal direction of a merge candidate 612 included in the same MER as a current CU and positioned at a different MER may be added to the merge candidate list of a current CU.

It means that merge candidates 630, 631 and 632 added to the merge candidate list of a current CU 604 according to the embodiment may be used for a current CU 604 by configuring a merge list with the merge candidates of a higher block 630 of a current CU 604.

Figure 7:
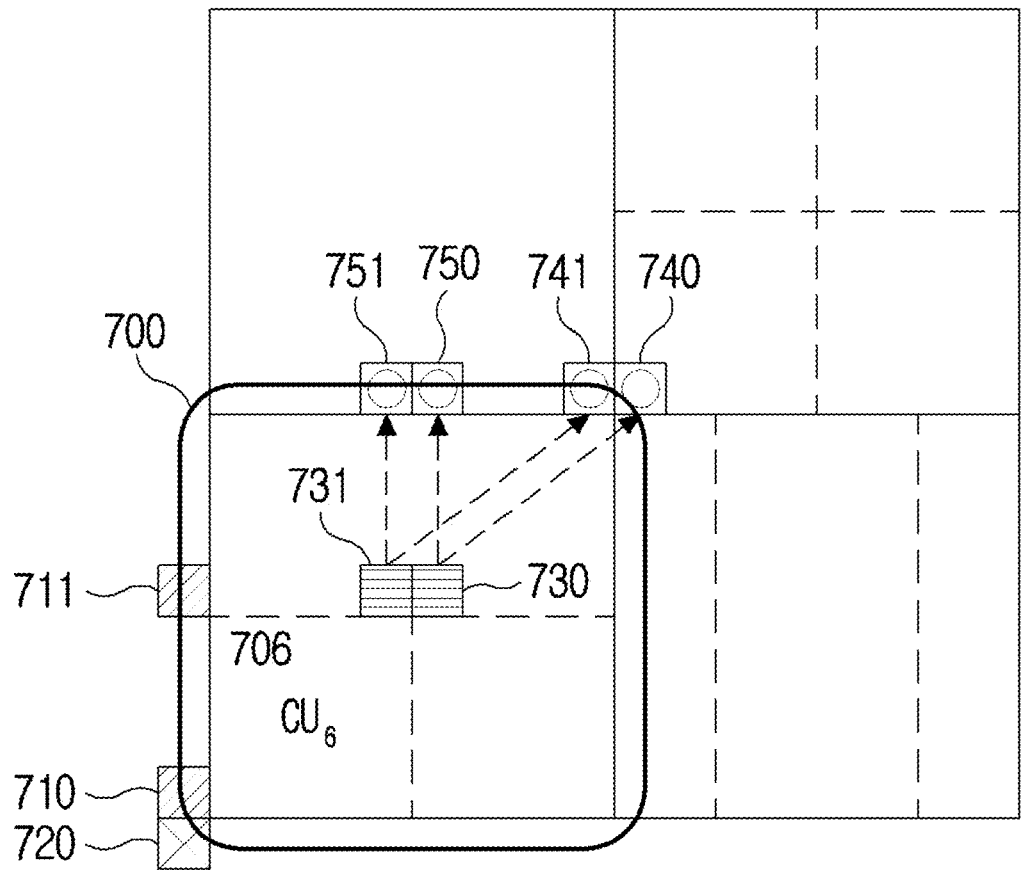
FIG. 7 is a diagram showing another embodiment on CU with a smaller size than MER.

FIG. 7 is a diagram showing another embodiment on CU with a smaller size than MER.

FIG. 7 is a diagram showing an example on CU 706 using a merge candidate at a position included in the same MER among a plurality of CUs with a smaller size than MER.

In addition, as shown in FIG. 7, it is suggested in the present disclosure that when a merge candidate included in the same MER is excluded, a spatially-separated position by a distance of a plurality of pixels outside MER for compensating it is used as an additional merge candidate.

As FIG. 7 is a diagram showing an embodiment on CU 706 with a smaller size than MER, 706 CU is described as an embodiment to show that a merge candidate at a position included in the same MER among a plurality of CUs 705, 706 and 707 with a smaller size than MER is excluded in FIG. 7.

When a spatially adjacent merge candidate of a current CU 706 exists like 710, 711, 720, 730, 731 in FIG. 7, candidates 710 and 711 which are encoded and decoded in encoding and decoding a current CU and are not included in the same MER may be added to a merge candidate list when motion information is available for reference. In other words, motion information at the corresponding position 710 and 711 may be used as a merge candidate of a current CU 706.

In addition, a merge candidate 720 at a position which is not encoded and decoded yet in encoding and decoding a current CU is excluded from a merge candidate.

In addition, merge candidates 730 and 731 included in the same MER 700 as a current CU among the spatially adjacent merge candidates of the current CU 706 are not added to a list in a process of generating a merge candidate list.

In case of an embodiment corresponding to the current CU 706, loss occurs in a process of configuring a spatially adjacent merge candidate because spatially adjacent merge candidates are included in the same MER 700 and excluded in a process of configuring a merge candidate list as a case of being excluded by the encoding and decoding order.

To solve it, the present disclosure suggests a method of configuring a merge candidate list which uses a merge candidate spatially positioned at a distance of a plurality of pixels as an additional merge candidate.

In this case, as an embodiment in which a merge candidate positioned at a distance of a plurality of pixels is used as an additional merge candidate, both a case that it is used when a merge candidate list is not satisfied as many as the maximum number of merge candidates or a case that it is used when merge candidates included in the same MER are excluded may be included.

As shown in FIG. 7, merge candidates 740, 741, 750 and 751, which are positioned at a specific pixel distance and have a specific directionality with merge candidates 730 and 731 included in the same MER 700 as a current CU, may be used as an additional merge candidate.

According to an embodiment, merge candidates 740 and 741 positioned in a diagonal direction of merge candidates 730 and 731 included in the same MER as a current CU and positioned at a different MER may be added to the merge candidate list of a current CU.

In addition, according to an embodiment, merge candidates 750 and 751 positioned in a vertical direction of merge candidates 730 and 731 included in the same MER as a current CU and positioned at a different MER may be added to the merge candidate list of a current CU.

As shown in FIGS. 5, 6 and 7, dependency on a position included in the same MER or PER as a current CU may be removed in encoding and decoding a current CU in parallel.

In this case, the size (or range) of MER or PER for parallel processing may be transmitted by using a higher-level syntax.

In this case, a higher-level syntax may be transmitted by using one or more parameter sets of a sequence parameter set (SPS), a picture parameter set (PPS) or a slice header.

In addition, the size of the corresponding MER and PER may not be limited to a square shape, and a non-square with different width and height. The width and height may be signaled independently. Alternatively, for the size (or range) of the corresponding MER or PER, using a predefined size may be also included in a scope of the present disclosure.

Interdependency between CUs included in the same MER or PER may be removed, a merge candidate in a process of generating a merge candidate list used in a motion prediction process and a motion prediction candidate for motion prediction may be included, a region included in the same MER or PER may be excluded additionally from a reference pixel configuration for calculating a linear parameter in inter-component prediction and a template configuration for template matching, and a method of using a region corresponding to a different MER or PER may be included in a scope of the present disclosure.

Figure 8:
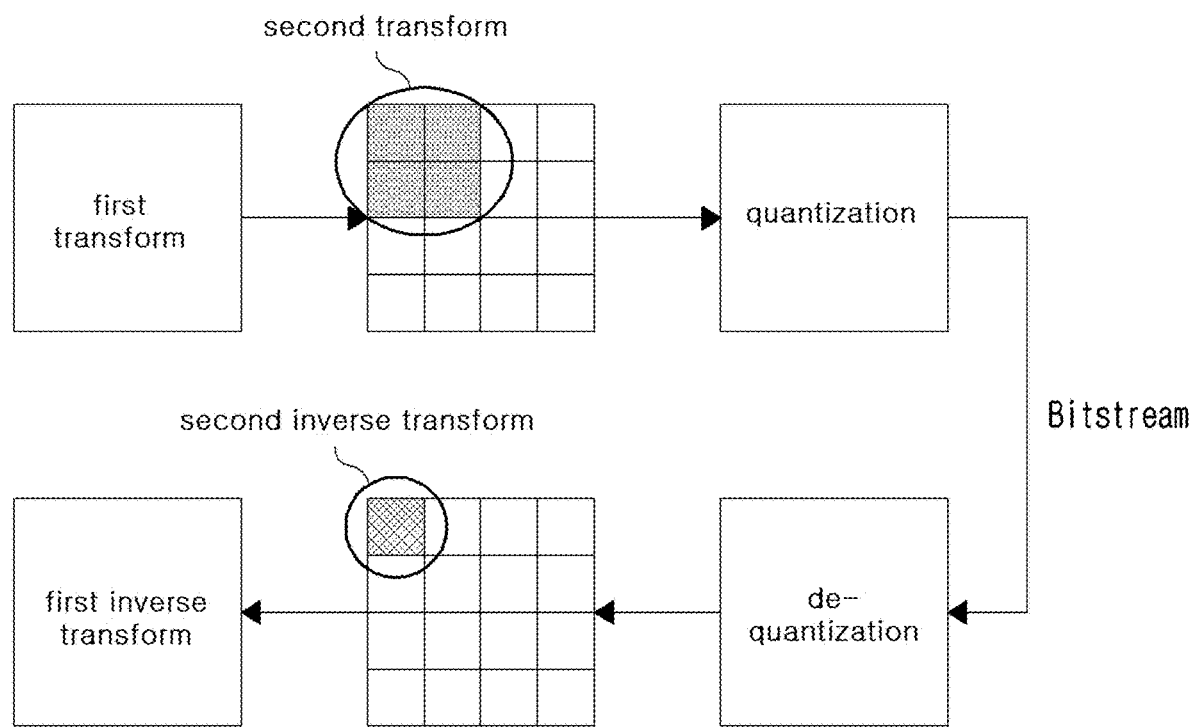
FIG. 8 shows a method in which a residual sample of a current block is encoded/decoded as an embodiment to which the present disclosure is applied.

FIG. 8 shows a method in which a residual sample of a current block is encoded/decoded as an embodiment to which the present disclosure is applied.

To reconstruct a residual sample of a current block to be transformed, at least one of inverse transform in a vertical direction or inverse transform in a horizontal direction may be performed. Inverse transform of the present disclosure may be implemented by 2D-inverse transform or may be implemented by 1D-inverse transform for each vertical/horizontal direction.

For example, one or more K*L transforms may be applied to L*K transform coefficients to reconstruct a residual sample of a current block in a K×L size. In this case, when K and L is the same, square or non-square transform may be applied.

Alternatively, inverse transform may be performed for a block which is half the size of a current block to reconstruct a K*L current block. For example, K*L/2 transform and/or K/2*L transform may be applied to a L/2*K/2 transform coefficient to reconstruct a residual sample of a K×L current block. Likewise, when K and L are the same, square or non-square transform may be applied. K*L/2 transform may correspond to part of the K*L transform. In addition, K/2*L transform may correspond to part of K×L transform. To reconstruct a K*L transform coefficient, K*L/2 transform may be performed and may be implemented in whole or in part in a butterfly structure in some cases. This butterfly structural calculation may correspond to part of a K*L butterfly structure. To reconstruct a K*L residual sample, K/2*L transform may be performed and may be implemented in whole or in part in a butterfly structure in some cases. This butterfly structural calculation may correspond to part of a K*L butterfly structure.

To reconstruct a residual sample of a K*L current block, inverse transform with a size of P×O may be performed. P is smaller than K, and O is smaller than L. In this case, K*0 transform and/or P*L transform may be applied to O×P transform coefficients. In this case, when K and L are the same, square or non-square transform may be applied. In addition, O and P may be the same, O may be an integer smaller than or the same as L, and P may be an integer smaller than or the same as K. In this case, K*O transform may correspond to part of K*L transform, and P*L transform may correspond to part of K*L transform. To reconstruct a residual sample of a K*L current block, K*O transform may be performed through matrix operation. In some cases, implementation is possible in whole or in part in a butterfly structure. This butterfly structural calculation may correspond to part of a K*L butterfly structure.

To reconstruct a K*L residual signal, P*L primary transform may be possible through matrix operation and in some cases, may be implemented in part or in whole in a butterfly structure. This butterfly structural calculation may correspond to part of a K*L butterfly structure.

A K*L current block may be obtained by 2D-inverse transforming L*K transform coefficients. Such 2D-inverse transform may be performed by performing 1D-inverse transform in a horizontal direction and a vertical direction, respectively or simultaneously. Such a process may be represented by matrix calculation and 1D-inverse transform in a horizontal direction and in a vertical direction may be calculated by the matrix product of a preceding clause and a succeeding clause.

To indicate such a case in a bitstream, a determination may be made by one flag or mode. Alternatively, a determination may be made according to inter prediction and intra prediction, and may be made by the maximum prediction size or the maximum transform size in one CTU. As an embodiment, in case of an inter or intra prediction block or in case of the largest prediction or transform block, inverse transform smaller than that block may be used all the time. When being smaller than the largest block, a residual sample is reconstructed by inverse transform with the same size as that block all the time. Smaller transform may be used all the time, but a determination may be made by information such as a flag, etc. as mentioned above. Alternatively, inverse transform smaller than a size of a residual block may be used when a high frequency component is not included in a transform coefficient and a coefficient exists only in a partial region in terms of reconstruction.

In addition, when the size of a coding block currently performing encoding and decoding is greater than the maximum transform size, transform and inverse transform may be performed by partition into the maximum transform size without additional signaling. In this case, when the corresponding coding block is square, it includes partitioning one block into a plurality of transform blocks by using the maximum transform size to have the same number of columns and rows. On the other hand, when the corresponding coding block is non-square, one block may be partitioned into a plurality of transform blocks by using the maximum transform size to have the same number of columns and rows, but a transform block may be also kept as the same square block as the maximum transform size and the number of transform blocks may vary according to the width and height of a coding block. Hereinafter, in reference to FIG. 8, a method of reconstructing a residual sample will be described in detail.

First, a transform unit 130 of an image encoding device may obtain a transform coefficient by performing transform for a sample of a residual block, i.e., a residual sample. A quantization unit 135 may obtain a quantized transform coefficient by performing quantization for the transform coefficient.

A transform unit 130 may additionally perform transform for the transform coefficient. Hereinafter, transform which is applied to a residual sample is referred to as first transform and transform which is applied to a transform coefficient according to the first transform is referred to as second transform. But, the second transform is not limited to being performed between the first transform and quantization. For example, the second transform may be performed before the first transform. Alternatively, a transform coefficient may be obtained by performing only the second transform for a residual sample and the first transform may be omitted.

The above-mentioned second transform may be performed based on at least one of a size or shape of a current block (or a residual block). For example, when the size of a current block is smaller than a predetermined threshold value, a N*N transform matrix may be applied. Otherwise, a M*M transform matrix may be applied. In this case, N may be an integer such as 4, 8 or more and M may be an integer such as 8, 16 or more. N may be smaller than M. The threshold value may be an integer such as 8, 16 or more.

In an example, when the minimum value of width or height of a current block is smaller than 8, the second transform may be performed based on a 4×4 transform matrix. Alternatively, when the minimum value of width or height of a current block is greater than or the same as 8, the second transform may be performed based on a 8×8 transform matrix.

But, a transform matrix for the second transform is not limited to a square shape and a non-square transform matrix may be used. The second transform based on a non-square transform matrix may be a process of mapping a (W*H)-sized current block into a (w1*h1)-sized sub-block. A sub-block may mean a partial region of a current block. In other words, w1 may be greater than 0 and smaller than or the same as W, and h1 may be greater than 0 and smaller than or the same as H. The partial region may be a w1*h1 block positioned at the left, the top or the top-left within a current block. As a result of the second transform, only a nonzero transform coefficient may be generated in a sub-block and only a zero transform coefficient may be generated in the remaining region of a current block. The size/shape of the sub-block may be variably determined based on the size of the above-mentioned transform matrix. Alternatively, the number of nonzero transform coefficients belonging to a sub-block may be variably determined based on the size of a transform matrix.

On the other hand, a dequantization unit 220 of an image decoding device may obtain a dequantized transform coefficient by performing dequantization for a transform coefficient obtained in a bitstream. An inverse transform unit 225 may reconstruct a residual sample by performing inverse transform for a dequantized transform coefficient.

An inverse transform unit 225 may perform additional inverse transform between the dequantization and the inverse transform. Hereinafter, additional inverse transform is referred to as second inverse transform, and inverse transform which is applied to a transform coefficient according to the second inverse transform is referred to as first inverse transform. But, the second inverse transform is not limited to being performed between dequantization and the first inverse transform. For example, the second inverse transform may be performed after the first transform. Alternatively, a residual sample may be reconstructed by performing the second inverse transform for a dequantized transform coefficient and in this case, the first inverse transform may be omitted.

The above-mentioned second inverse transform may be performed based on at least one of a size or a shape of a current block (or a residual block). A transform matrix for the second inverse transform is as described in the second transform process and herein, detailed description will be omitted.

In addition, for a transform matrix for the second inverse transform, a non-square transform matrix as well as a square transform matrix may be used. The second inverse transform based on a non-square transform matrix may be understood as an inverse process of the above-mentioned second inverse transform. In other words, the second inverse transform may be a process of mapping a (w1*h1)-sized sub-block into a (W*H)-sized current block. In this case, a sub-block may mean a partial region of a current block. In other words, w1 may be greater than 0 and smaller than or the same as W and h1 may be greater than 0 and smaller than or the same as H. The partial region may be a w1*h1 block positioned at the left, the top or the top-left within a current block. Through the second inverse transform, a (W*H)-sized transform coefficient of a current block may be generated from a (w1*h1)-sized transform coefficient of a sub-block. Based on the size/shape of the transform matrix, at least one of a size, a shape, a position, or the number of nonzero transform coefficients of a sub-block mapped to a current block may be determined.

The above-mentioned transform matrix may be determined from a plurality of transform sets. The number of transform sets which are predefined in an image encoding/decoding device may be 1, 2, 3, 4 or more. Each transform set may be configured with one or more transform matrixes. In this case, for a transform set of a current block, information specifying a transform set may be signaled from an image encoding device. Alternatively, the transform set of a current block may be determined by considering a size, a shape, a partition type, a component type (e.g., a luma/chroma component), whether an intra prediction mode is nondirectional, an angle of an intra prediction mode, whether a nonzero transform coefficient exists, whether transform is skipped, etc. of a block. In this case, whether transform is skipped may mean whether the first inverse transform is performed. In an example, a transform set may be selected based on an intra prediction mode (IntraPredMode) as the following Table 1. But, when an intra prediction mode of a current block represents an inter-component prediction mode, a transform set may be determined based on a transform set index which is pre-promised in an image encoding/decoding device.

TABLE 1

| IntraPredMode | Transform Set Index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

A transform matrix of a current block may be determined based on any one of a plurality of transform types (or transform matrixes) belonging to the selected transform set. For this, a separate index may be signaled from an image encoding device. The index may represent whether the above-mentioned second inverse transform is performed. Alternatively, the index may represent whether the second inverse transform based on the above-mentioned non-square transform matrix is performed. In addition, the index may specify any transform type of preselected transform set.

For example, when the index is a first value, the second inverse transform may be skipped, and when the index is a second value, the second inverse transform may be performed based on a transform type corresponding to the second value.

Alternatively, the index may include a first index representing whether the second inverse transform is performed and a second index specifying a transform type. In this case, when the first index is a first value, the second inverse transform may be performed and otherwise, the second inverse transform may be skipped. When the first index is the first value, the second index may be signaled, and a transform type may be determined based on the signaled second index.

The second inverse transform may be performed only when a predetermined condition is satisfied.

For example, in a current block, the second inverse transform may be selectively performed by considering whether a nonzero transform coefficient exists in a region excluding the above-mentioned sub-block. In other words, when a nonzero transform coefficient exists in a region excluding a sub-block, it means the second transform is not performed in an image encoding device. Accordingly, the second inverse transform may be performed only when whether a nonzero transform coefficient exists is confirmed for at least one of the right, the bottom or the bottom-right region of a current block and a nonzero transform coefficient does not exist in the corresponding region. Alternatively, only when a nonzero transform coefficient does not exist in the corresponding region, an index may be signaled, and the second inverse transform may be selectively transformed based on a signaled index.

Alternatively, the second inverse transform may be performed when the size of a current block is greater than or the same as a predetermined threshold value. The threshold value may be an integer such as 4, 8 or more. When the width and height of a current block are greater than or the same as a threshold value, the second inverse transform may be applied. Alternatively, even when any one of width or height of a current block is greater than or the same as the threshold value, the second inverse transform may be implemented to be applied.

Alternatively, only when the first inverse transform for a current block is performed, the second inverse transform may be performed.

Alternatively, only when a current block is a block encoded by an intra mode, the second inverse transform may be performed. But, when sub-block-based intra prediction for a current block is performed, it may be limited so that the second inverse transform is not performed. Sub-block-based intra prediction is as described in FIG. 3 and herein, detailed description will be omitted.

The second inverse transform may be limitedly performed by considering only any one of the above-mentioned conditions. Alternatively, the second inverse transform may be limitedly performed based on a combination of at least two conditions.

Figure 9:
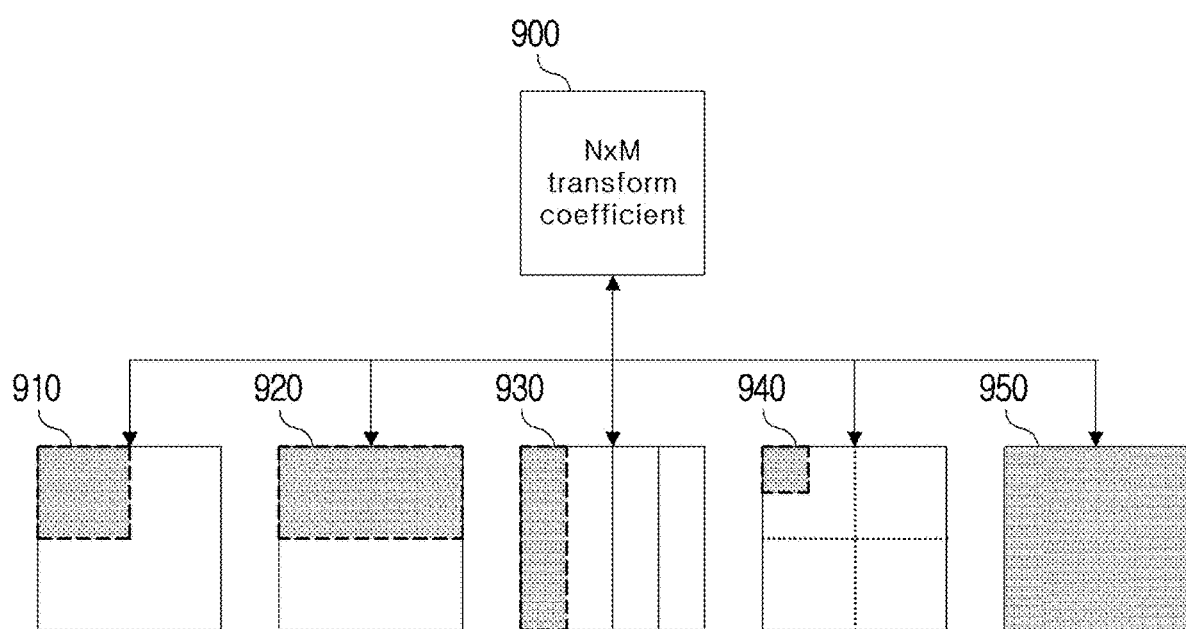
FIG. 9 is an example of second transform according to a block size/shape as an embodiment to which the present disclosure is applied.

FIG. 9 is an example of second transform according to a block size/shape as an embodiment to which the present disclosure is applied.

In reference to FIG. 9, it is assumed that a current block to be transformed is a block having a N*M size/shape. A N*M block 900 may include a transform coefficient generated by the first transform.

An image encoding device may perform the second transform for a transform coefficient of the N*M block 900 and in this case, the transform coefficient of a N*M block 900 may be mapped into a transform coefficient belonging to a partial region of a N*M block 900. In this case, a N*M block 900 may be square (N=M) or may be non-square (N<M, N>M). The partial region may be a top-left region 910 within a N*M block 900 or may be a top region 920 or a left region 930 within a N*M block 900.

Alternatively, when at least one of width or height of a N*M block 900 is greater than a predetermined threshold size, a N*M block 900 may be partitioned into a plurality of sub-blocks based on a predetermined partition type, and the second transform may be performed only for at least one of a plurality of sub-blocks. The threshold size may be an integer such as 8, 16 or more. The partition type may be performed based on at least one of quad tree, binary tree or ternary tree. Alternatively, the partition may be performed only by one or more vertical lines or only by one or more horizontal lines. In this case, the second transform may be applied to a sub-block positioned at the top-left, the left or the top of a plurality of sub-blocks. But, it is not limited thereto and it may be applied to a sub-block positioned at at least one of the top-right, the bottom-left, the bottom-right, the right or the bottom. The transform coefficient of a sub-block to which the second transform is applied may be mapped into a transform coefficient belonging to a partial region of the corresponding sub-block. In this case, a partial region may be a region positioned at the top-left, the top or the left of the corresponding sub-block.

For example, as shown in FIG. 9, a N*M block 900 may be partitioned into four sub-blocks based on quad tree, and the second transform may be performed only for a top-left sub-block among four sub-blocks. In this case, the transform coefficient of a top-left sub-block may be mapped into a transform coefficient of a top-left region 940 within a top-left sub-block.

Alternatively, an image encoding device may perform the second transform for a transform coefficient of the N*M block 900 and in this case, the transform coefficient of a N*M block 900 may be mapped into a transform coefficient belonging to the whole region 950 of a N*M block 900.

The transform coefficient belonging to a partial region and/or a whole region which is mapped may be all nonzero transform coefficients or may include at least one nonzero transform coefficient. In addition, in a region to which the second transform is applied, a zero transform coefficient may be generated in the remaining region excluding the mapped partial region.

An image decoding device may generate a transform coefficient of a N*M block 900 in an inverse process of the above-mentioned second transform. In other words, the transform coefficient of a N*M block 900 may be generated by performing the second inverse transform for a transform coefficient in a partial region.

The above-mentioned mapping relation may be determined based on at least one of a size (at least one of width and height), a shape, a ratio of width and height, or a partition type of a N*M block 900, and hereinafter, it will be described in detail.

1. When N=M=8

When a current block is a 8×8 block, a 16×64 transform matrix may be applied in an image encoding device. 8×8 transform coefficients in the 2D shape may be represented as 64×1 transform coefficients in a 1D shape. Through the second transform, 64×1 transform coefficients may be mapped into 16×1 transform coefficients and it may be rearranged into a 4×4 block in a 2D shape based on the predetermined scanning order. In other words, a transform coefficient of the 8×8 block resulting from the first transform may be mapped into a transform coefficient of a 4×4 block through the second transform. In this case, the 4×4 block may have only a nonzero transform coefficient and it may be positioned at the top-left within a 8×8 block. Only a zero transform coefficient may be generated in the remaining region excluding the 4×4 block in the 8×8 block. In an image decoding device, through an inverse process of the above-mentioned second transform, a transform coefficient of a 8×8 block may be generated from a transform coefficient of a 4×4 block, a partial region in a 8×8 block.

Alternatively, when a current block is a 8×8 block, a 8×64 transform matrix may be applied. Likewise, 8×8 transform coefficients in the 2D shape may be represented as 64×1 transform coefficients in a 1D shape. Through the second transform, 64×1 transform coefficients may be mapped into 8×1 transform coefficients and it may be rearranged into a 4×2 block (or a 2×4 block) in a 2D shape based on the predetermined scanning order. In other words, a transform coefficient of the 8×8 block resulting from the first transform may be mapped into a transform coefficient of a 4×2 block (or a 2×4 block) through the second transform. In this case, the 4×2 block (or a 2×4 block) may have only a nonzero transform coefficient and it may be positioned at the top-left within a 8×8 block. In the 8×8 block, only a zero transform coefficient may be generated in the remaining region excluding the 4×2 block (or the 2×4 block). In an image decoding device, through an inverse process of the above-mentioned second transform, a transform coefficient of a 8×8 block may be generated from a transform coefficient of a 4×2 block (or a 2×4 block), a partial region in a 8×8 block.

When a current block is a 8×8 block, any one of transform matrixes with the predetermined size may be selectively used. The selection may be performed based on at least one of a size, a shape, or a partition type (e.g., quad tree, binary tree, ternary tree) of a block. In this case, a block may mean at least one of a current block, a spatial neighboring block of a current block or a higher block to which a current block belongs. A higher block may mean a block with a smaller split depth than a current block. For example, when only a square block is included in a higher block, a small size-transform matrix (e.g., a 8×64 transform matrix) may be used and otherwise, a large size-transform matrix (e.g., a 16×64 transform matrix) may be used. Alternatively, when a current block is partitioned based on quad tree, a small size-transform matrix (e.g., a 8×64 transform matrix) may be used and otherwise, a large size-transform matrix (e.g., a 16×64 transform matrix) may be used. A method of selectively using the above-mentioned transform matrix may be applied the same as in the after-mentioned embodiment.

2. When N=M=4

When a current block is a 4×4 block, a 16×16 transform matrix may be applied in an image encoding device. 4×4 transform coefficients in the 2D shape may be represented as 16×1 transform coefficients in a 1D shape. Through the second transform, 16×1 transform coefficients may be mapped into 16×1 transform coefficients and it may be rearranged into a 4×4 block in a 2D shape based on the predetermined scanning order. In other words, a transform coefficient of the 4×4 block resulting from the first transform may be mapped into the transform coefficient of a 4×4 block through the second transform. In this case, the 4×4 block may have only a nonzero transform coefficient. In an image decoding device, in an inverse process of the above-mentioned second transform, a transform coefficient of a 4×4 block may be generated from a transform coefficient of a 4×4 block.

Alternatively, when a current block is a 4×4 block, a 8×16 transform matrix may be applied. Likewise, 4×4 transform coefficients in the 2D shape may be represented as 16×1 transform coefficients in a 1D shape. Through the second transform, 16×1 transform coefficients may be mapped into 8×1 transform coefficients and it may be rearranged into a 4×2 block (or a 2×4 block) in a 2D shape based on the predetermined scanning order. In other words, a transform coefficient of the 4×4 block resulting from the first transform may be mapped into the transform coefficient of a 4×2 block (or a 2×4 block) through the second transform. In this case, the 4×2 block (or a 2×4 block) may have only a nonzero transform coefficient and it may be positioned at the top (or the left) within a 4×4 block. Only a zero transform coefficient may be generated in the remaining region excluding the 4×2 block (or the 2×4 block) within the 4×4 block. In an image decoding device, in an inverse process of the above-mentioned second transform, a transform coefficient of a 4×4 block may be generated from a transform coefficient of a 4×2 block (or a 2×4 block), a partial region in a 4×4 block.

3. When N*M>8×8

When a current block is greater than a 8×8 block, an image encoding device may perform the second transform for a whole or partial region of a current block. For example, the second transform may be performed per 8×8 block in a current block. Alternatively, the partial region may be a 8×8 block positioned at at least one of the left, the top or the top-left within a current block. In this case, the second transform may be performed based on a 16×64 transform matrix and it is the same as shown in the section 1. when N=M=8. In an example, when a current block is 16×16, the transform coefficient of a top-left 8×8 block of a current block may be mapped into the transform coefficient of a top-left 4×4 block of a current block through the second transform. In this case, the 4×4 block may have only a nonzero transform coefficient and only a zero transform coefficient may be generated in the remaining region excluding the 4×4 block within a top-left 8×8 block. And, 8×8 blocks positioned at the top-right, the bottom-left and the bottom-right of a current block may be configured with a transform coefficient resulting from the first transform. In an image decoding device, through an inverse process of the above-mentioned second transform, a transform coefficient of a top-left 8×8 block may be generated from a transform coefficient of a 4×4 block, a partial region of a top-left 8×8 block within a current block. The transform coefficients of remaining 8×8 blocks may be generated by dequantization.

But, the embodiment is not limited to a 16×64 transform matrix and a 8×64 transform matrix may be applied. It is the same as shown in the section 1. when N=M=8 and herein, detailed description will be omitted.

4. When N*M is 4×8 or 8×4

When a current block is a 4×8 block (or a 8×4 block), an image encoding device may perform the second transform for a whole or partial region of a current block. For example, the second transform may be performed per 4×4 block in a current block. Alternatively, the partial region may be a 4×4 block positioned at at least one of the left or the top of a current block. In this case, the second transform may be performed based on a 16×16 transform matrix and it is the same as shown in the section 2. when N=M=4. In an example, when a current block is 4×8, the transform coefficient of a top 4×4 block of a current block may be mapped into the transform coefficient of a top 4×4 block of a current block through the second transform. And, a bottom 4×4 block of a current block may be configured with a transform coefficient resulting from the first transform. In an image decoding device, through an inverse process of the above-mentioned second transform, a transform coefficient of a top 4×4 block may be generated from a transform coefficient of a top 4×4 block within a current block. And, a transform coefficient of a bottom 4×4 block may be generated by dequantization.

But, the embodiment is not limited to a 16×16 transform matrix and a 8×16 transform matrix may be applied. It is the same as shown in the section 2. when N=M=4. In an example, when a current block is 4×8, the transform coefficient of a top 4×4 block of a current block may be mapped into the transform coefficient of a top 4×2 block (or a left 2×4 block) of a current block through the second transform. In this case, a top 4×2 block (or a left 2×4 block) may have only a nonzero transform coefficient and only a zero transform coefficient may be generated in the remaining region excluding a top 4×2 block (or a left 2×4 block) within a top 4×4 block. And, a bottom 4×4 block of a current block may be configured with a transform coefficient resulting from the first transform. In an image decoding device, through an inverse process of the above-mentioned second transform, a transform coefficient of a top 4×4 block within a current block may be generated from a transform coefficient of a top 4×2 block (or a left 2×4 block) within a current block. And, a transform coefficient of a bottom 4×4 block within a current block may be generated by dequantization.

5. When any One of N or M is Greater than or the Same as 16.

When any one of width or height of a current block is greater than or the same as 16, an image encoding device may perform the second transform for a whole or partial region of a current block. For example, the second transform may be performed per 4×4 block in a current block. Alternatively, the partial region may be a 4×4 block positioned at at least one of the left or the top of a current block. The partial region may further include one or more 4×4 blocks which neighbor a 4×4 block positioned at the left or the top in a right or bottom direction. In this case, the second transform may be performed based on a 16×16 transform matrix or a 8×16 transform matrix and it is the same as shown in the section 2. when N=M=4.

Figure 10:
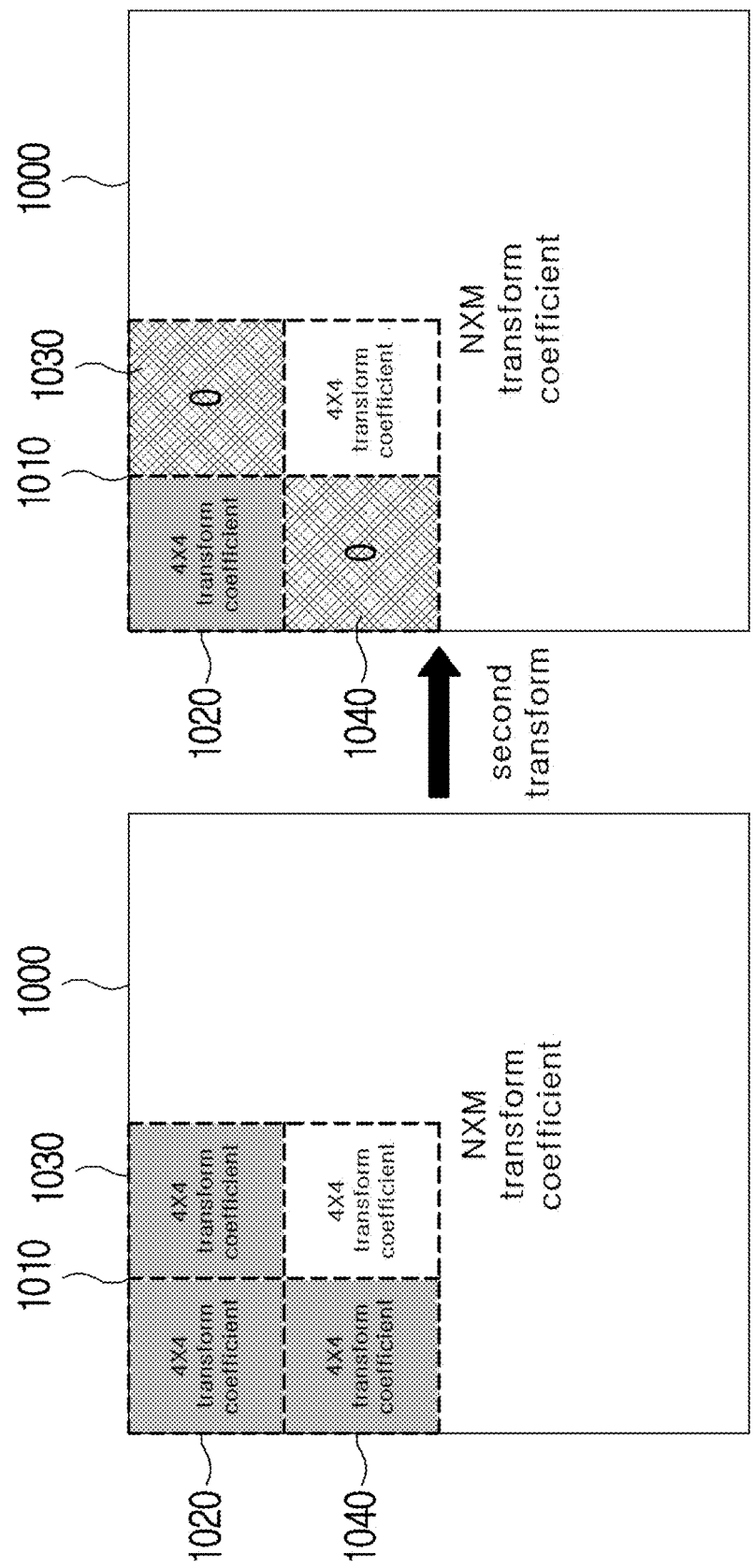
FIG. 10 shows a second transform method according to a transform matrix size as an embodiment to which the present disclosure is applied.

FIG. 10 shows a second transform method according to a transform matrix size as an embodiment to which the present disclosure is applied.

The second transform may be performed based on a R*C transform matrix. In this case, the second transform may be a process of mapping C transform coefficients belonging to the current block resulting from the first transform into R transform coefficients. In other words, by controlling a value of C for a R*C transform matrix, a range of a region where the second transform is performed and which is mapped to R transform coefficients may be variably determined.

For example, when the second transform is performed based on a 16×64 transform matrix, 64 transform coefficients (e.g., a 8×8 block) belonging to the current block resulting from the first transform may be mapped to 16 transform coefficients (e.g., a 4×4 block). Alternatively, when the second transform is performed based on a 16×48 transform matrix, 48 transform coefficients belonging to the current block resulting from the first transform may be mapped to 16 transform coefficients.

In FIG. 10, it is assumed that a current block 1000 has a N*M size and is a block resulting from the first transform, and N and M are greater than or the same as 8, respectively.

In an image encoding device, when the second transform is performed based on a 16×48 transform matrix, 48 transform coefficients belonging to a current block may be mapped to 16 transform coefficients. In this case, 48 transform coefficients may belong to a top-left 8×8 block 1010 within a current block. In particular, 48 transform coefficients may belong to a top-left 4×4 block 1020, a top-right 4×4 block 1030 and a bottom-left 4×4 block 1040 within the top-left-top 8×8 block 1010. 16 transform coefficients generated by the second transform may belong to a top-left 8×8 block 1010 within a current block. And, among regions where the second transform is performed, a zero transform coefficient may be generated in the remaining 4×4 blocks 1030 and 1040.

When the second transform is performed based on a 16×48 transform matrix in an image encoding device, an image decoding device may derive transform coefficients of a top-left 4×4 block 1020, a top-right 4×4 block 1030 and a bottom-left 4×4 block 1040 from transform coefficients of a top-left 4×4 block 1020 within a current block through the second inverse transform based on a 48×16 transform matrix.

Figure 11:
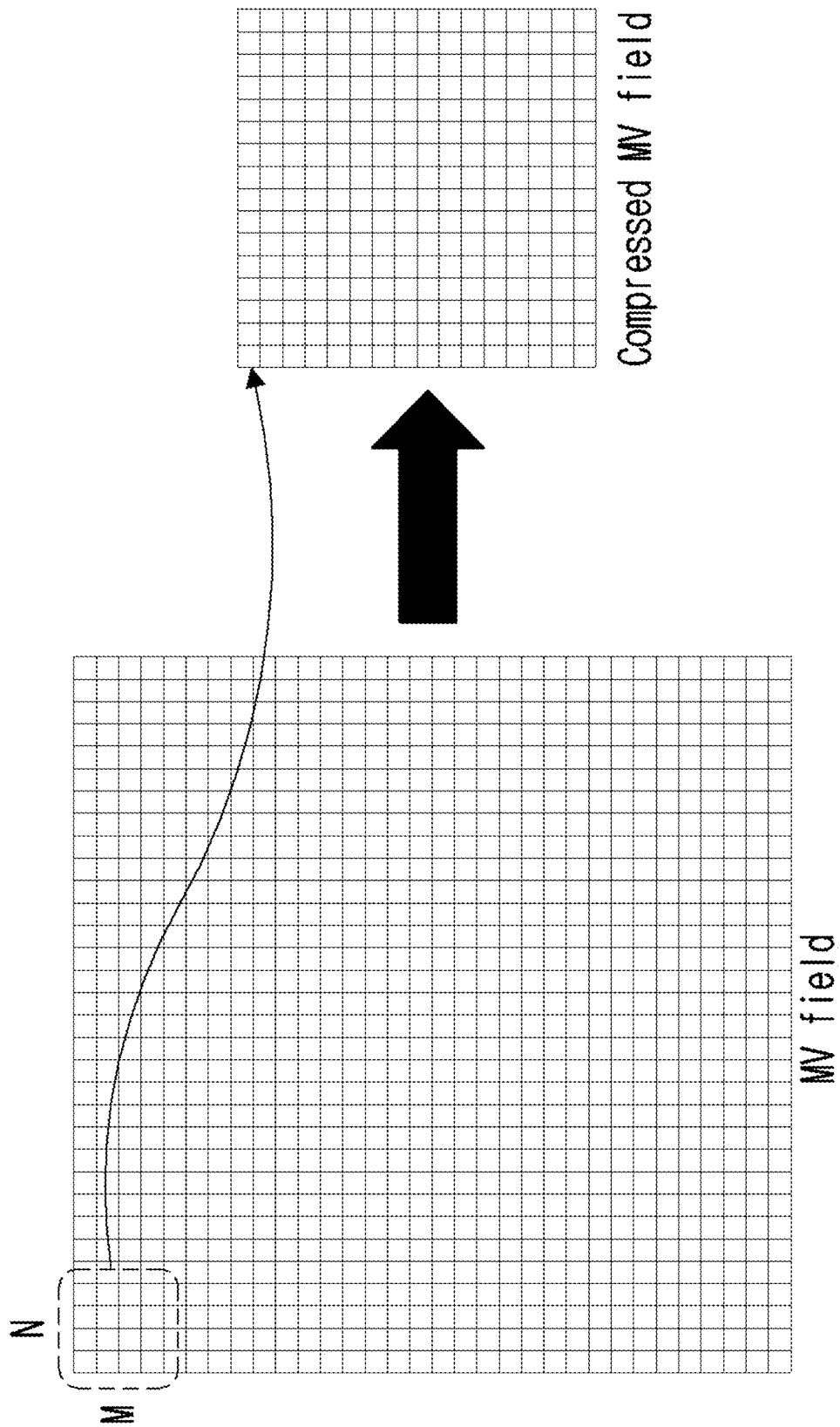
FIG. 11 is a diagram showing a conceptual diagram on a method of storing a compressed motion vector.

FIG. 11 is a diagram showing a conceptual diagram on a method of storing a compressed motion vector.

FIG. 11 shows a method of compressing and storing a motion vector of a target image block in a unit of a certain block size in encoding and decoding. In this case, compression in a unit of the certain block size refers to storing a motion vector and reference index information corresponding to a group unit of specific pixels as a representative value obtained by at least one method of sub-sampling, an average value or a median value.

In FIG. 11, one unit block exists and motion information of the corresponding block may be applied in a pixel unit, but storage may be possible in a certain block unit due to an issue such as storage memory optimization, hardware implementation, etc. In addition, a motion vector may be additionally compressed to refer to such motion information in a different picture which is temporally adjacent.

FIG. 11 is a diagram showing a concept that motion information is stored based on compression in storing motion information. In this case, compressing motion information refers to storing a motion vector and reference index information corresponding to a group unit of specific pixels as a representative value obtained by at least one method of sub-sampling, an average value or a median value.

In addition, in compressing the motion information, when a size of a pixel block corresponding to that compressed target motion may be 4×4, 8×8, 16×16, 32×32 and 64×64.

Figure 12:
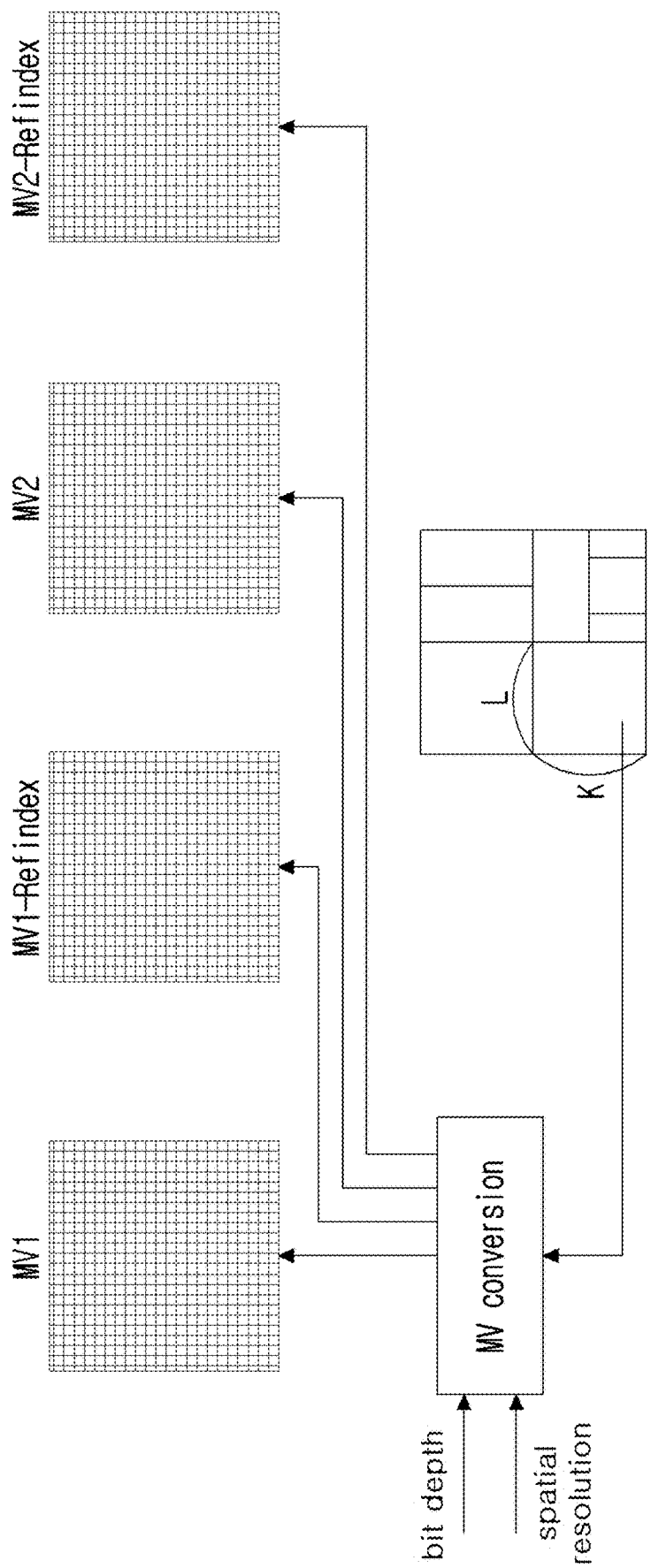
FIG. 12 is an embodiment on a method of storing a motion vector according to the present disclosure.

FIG. 12 is an embodiment on a method of storing a motion vector according to the present disclosure.

In particular, FIG. 12 shows a method of extracting a motion vector of a target image block in encoding and decoding. In this case, as shown in FIG. 12, a motion vector of a K×L pixel block is stored according to input spatial resolution. In addition, a method of storing based on a bit depth according to the accuracy or resolution of a motion vector is shown.

In FIG. 12, one unit block (N×M) may be a square or non-square block. In this case, the square or non-square block may be recursively partitioned based on a variety of tree types and may be partitioned by using quad-tree block partition, binary-tree block partition and ternary-tree block partition.

When one unit block shown in FIG. 12 is partitioned, a motion vector of a non-square or square partial block of K×L is stored as MV1 and MV2 with input spatial resolution. In this case, MV1 and MV2 may be a different reference image, respectively, and an index of this reference image may be separately stored. In addition, the motion vector of a K×L block is modified to fit the spatial resolution and stored.

In an example, when a motion vector of a 8×16 block is stored at 4×4 resolution, 8×16 is stored by being partitioned into eight 4×4. Inversely, when being stored at 16×16 resolution, storage may be performed by selecting one of blocks corresponding to 16×16 resolution or extracting a representative vector such as average, etc. In this case, a motion vector of a K×L block may be determined by a variety of bit depth according to a coding method.

In this case, in storing a motion vector, it may be stored as a bit depth designating the accuracy of a generated motion vector. For example, when a motion vector of a K×L block is calculated by ⅛ accuracy, it may be modified according to the bit depth and may be stored. For example, it may be stored by ¼ accuracy or 1/16 accuracy, etc. Such a process is performed by an operation such as shift, etc.

Figure 13:
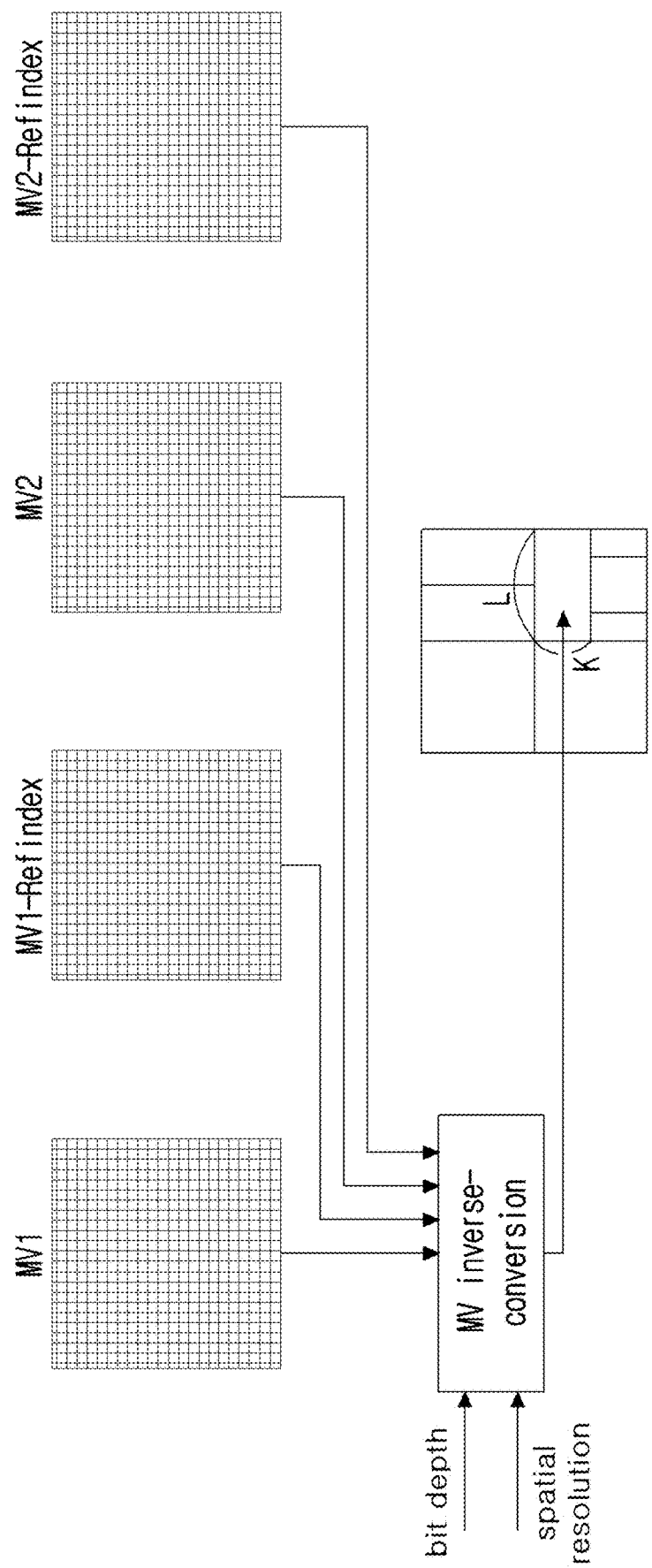
FIG. 13 is an embodiment on a method of extracting a motion vector according to the present disclosure.

FIG. 13 is an embodiment on a method of extracting a motion vector according to the present disclosure.

In particular, FIG. 13 shows a method of extracting a motion vector of a target image block in encoding and decoding. In this case, as shown in FIG. 13, a method of extracting a motion vector corresponding to a K×L pixel block or extracting a motion vector at a specific coordinate is shown. A stored motion vector which is corresponding according to spatial resolution should be extracted to extract a stored motion vector, and should be extracted by modifying bit depth according to the accuracy of a motion vector.

When one unit block shown in FIG. 13 is partitioned, MV1 and MV2 corresponding according to spatial resolution should be extracted to extract a motion vector which is corresponding to a rectangular or square partial block of K×L or to extract a motion vector at a specific coordinate. In some cases, only one motion vector may be extracted. In this case, MV1 and MV2 may be a different reference image, respectively and an index of a reference image which is separately stored with a motion vector is extracted.

In addition, for extracting a motion vector corresponding to a K×L block, that block extracts a motion vector corresponding to a top-left coordinate by considering spatial resolution. In an example, for extracting a motion vector corresponding to a 8×16 decoding block, a motion vector stored at 4×4 resolution and corresponding to the top-left of that block is extracted. Alternatively, a representative value such as one of a plurality of 4×4 resolution blocks corresponding to a 8×16 decoding block or an average, etc. of more than one 4×4 resolution block is used. Inversely, when a decoding block is smaller than motion vector storage resolution, a corresponding block uses by extracting a motion vector.

In this case, a motion vector stored with a specific bit depth is extracted, but is changed to a bit depth required for a decoding block in order to be used by the decoding block. For example, when it is stored with ½ bit depth, but a motion vector with ⅛ bit accuracy is required, it is necessary to adjust the accuracy of a motion vector by an operation such as shift, etc. to fit it.

To store and extract a motion vector and a reference image, bit depth and spatial resolution may be indicated and parsed from a bitstream to perform image encoding and decoding.

By changing bit depth and spatial resolution for storing a motion vector and a reference image, it is possible to deal with a problem for a device memory capacity.

According to an image sequence, bit depth and spatial resolution for storing and extracting other motion vectors and reference images may be changed. For example, a motion vector and a reference image resolution such as 4×4, 16×16, 32×32, etc. may be stored, bit depth may be stored in an integer pixel unit, ½, ¼, ¹⁄₁₆, etc. in storing each motion vector and it may be indicated in a bitstream.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for image encoding/decoding.

The invention claimed is:

1. A method of decoding an image signal with a decoding apparatus, comprising:
obtaining, with the decoding apparatus, transform coefficients of a current block from a bitstream including the image signal;
obtaining, with the decoding apparatus, dequantized transform coefficients of the current block by performing a dequantization on the transform coefficients; and
providing, with the decoding apparatus, a decoded image signal by generating, based on a first inverse-transform, residual samples of the current block from the dequantized transform coefficients,
wherein, in response to a case in which a second inverse-transform is additionally performed between the dequantization and the first inverse-transform, the residual samples of the current block are generated by performing the first inverse-transform on M transform coefficients resulting from performing the second inverse-transform, the M transform coefficients being generated by performing the second inverse-transform on N dequantized transform coefficients of a partial region within the current block,
wherein a value of M is less than or equal to a product of a width and a height of the current block and a value of N is less than the value of M,
wherein when the width and the height of the current block is equal to 4, respectively, the values of M and N are determined to be 16 and 8, respectively,
wherein when the width and the height of the current block is equal to 8, respectively, the value of M is determined to be 48 which is less than the product of the width and the height of the current block and the value of N is determined to be 8,
wherein the second inverse-transform is performed only when the current block is a block encoded in an intra mode and a non-zero transform coefficient does not exist in a remaining region other than the partial region within the current block,
wherein the second inverse-transform is performed based on a transform type of the current block,
wherein the transform type of the current block is determined as one of a plurality of transform types belonging to a transform set of the current block, and
wherein the transform set of the current block is determined as one of a plurality of transform sets according to an intra prediction mode of the current block.

2. The method of claim 1, wherein the second inverse-transform is performed only when a size of the current block is greater than or equal to a threshold size pre-defined in the decoding apparatus, and
wherein the threshold size is representative of 4 or 8.

3. The method of claim 1, wherein the transform type of the current block is determined, based on index information signaled from the bitstream, and
wherein the index information specifies one of the plurality of transform types for the second inverse-transform.

4. The method of claim 3, wherein the index information is signaled only when the non-zero transform coefficient does not exist in the remaining region within the current block.

5. A method of encoding an image signal with an encoding apparatus, comprising:
generating, with the encoding apparatus, based on a first transform, transform coefficients of a current block from residual samples of the current block in the image signal;
obtaining, with the encoding apparatus, quantized transform coefficients of the current block by performing a quantization on the transform coefficients; and
providing, with the encoding apparatus, an encoded image by entropy-encoding the quantized transform coefficients of the current block,
wherein in response to a case in which a second transform is additionally performed between the first transform and the quantization, N transform coefficients of a partial region within the current block are generated by performing the second transform on M first transform coefficients resulting from performing the first transform on the residual samples of the current block,
wherein a value of M is less than or equal to a product of a width and a height of the current block and a value of N is less than the value of M,
wherein when the width and the height of the current block is equal to 4, respectively, the values of M and N are determined to be 16 and 8, respectively,
wherein when the width and the height of the current block is equal to 8, respectively, the value of M is determined to be 48 which is less than the product of the width and the height of the current block and the value of N is determined to be 8,
wherein the second transform is performed only when the current block is a block encoded in an intra mode and a non-zero transform coefficient does not exist in a remaining region other than the partial region within the current block,
wherein the second transform is performed based on a transform type of the current block,
wherein the transform type of the current block is determined as one of a plurality of transform types belonging to a transform set of the current block, and wherein the transform set of the current block is determined as one of a plurality of transform sets according to an intra prediction mode of the current block.

6. A non-transitory computer-readable medium for storing data associated with an image signal, comprising:
- a data stream including transform coefficients of a current block,
- wherein a dequantization and a first inverse-transform are performed on the transform coefficients of the current block to generate residual samples of the current block,
- wherein in response to a case in which a second inverse-transform is additionally performed between the dequantization and the first inverse-transform, the residual samples of the current block are generated by performing the first inverse-transform on M transform coefficients resulting from performing the second inverse-transform, the M transform coefficients being generated by performing the second inverse-transform on N dequantized transform coefficients of a partial region within the current block,
- wherein a value of M is less than or equal to a product of a width and a height of the current block and a value of N is less than the value of M,
- wherein when the width and the height of the current block is equal to 4, respectively, the values of M and N are determined to be 16 and 8, respectively,
- wherein when the width and the height of the current block is equal to 8, respectively, the value of M is determined to be 48 which is less than the product of the width and the height of the current block and the value of N is determined to be 8,
- wherein the second inverse-transform is performed only when the current block is a block encoded in an intra mode and a non-zero transform coefficient does not exist in a remaining region other than the partial region within the current block,
- wherein the second inverse-transform is performed based on a transform type of the current block,
- wherein the transform type of the current block is determined as one of a plurality of transform types belonging to a transform set of the current block, and
- wherein the transform set of the current block is determined as one of a plurality of transform sets according to an intra prediction mode of the current block.

* * * * *